United States Patent
Tsukagoshi

(10) Patent No.: US 10,225,566 B2
(45) Date of Patent: Mar. 5, 2019

(54) TRANSMISSION DEVICE, TRANSMISSION METHOD, RECEPTION DEVICE, AND RECEPTION METHOD

(71) Applicant: SONY CORPORATION, Tokyo (JP)

(72) Inventor: Ikuo Tsukagoshi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 288 days.

(21) Appl. No.: 14/917,220

(22) PCT Filed: Oct. 1, 2014

(86) PCT No.: PCT/JP2014/076335
§ 371 (c)(1),
(2) Date: Mar. 7, 2016

(87) PCT Pub. No.: WO2015/064287
PCT Pub. Date: May 7, 2015

(65) Prior Publication Data
US 2016/0212435 A1      Jul. 21, 2016

(30) Foreign Application Priority Data

Nov. 1, 2013   (JP) .................................. 2013-228825

(51) Int. Cl.
*H04N 7/12*      (2006.01)
*H04N 19/31*     (2014.01)
(Continued)

(52) U.S. Cl.
CPC ............. *H04N 19/31* (2014.11); *H04N 19/36* (2014.11); *H04N 19/70* (2014.11);
(Continued)

(58) Field of Classification Search
CPC ........ H04N 19/31; H04N 19/36; H04N 19/70; H04N 21/85406; H04N 21/8451;
(Continued)

(56) References Cited

U.S. PATENT DOCUMENTS

| 6,633,339 B1 | 10/2003 | Goto et al. |
| 2002/0012399 A1 | 1/2002 | Nishi et al. |

(Continued)

FOREIGN PATENT DOCUMENTS

| EP | 2 658 267 A1 | 10/2013 |
| JP | 2000-350203 A | 12/2000 |

(Continued)

OTHER PUBLICATIONS

International Search Report dated Jan. 6, 2015, in PCT/JP2014/076335 Filed Oct. 1, 2014.

(Continued)

*Primary Examiner* — Allen C Wong
(74) *Attorney, Agent, or Firm* — Oblon, McClelland, Maier & Neustadt, L.L.P.

(57) ABSTRACT

It is possible to perform excellent reproduction regardless of whether or not a reception side supports a high frame rate. Image data of pictures configuring moving image data are classified into a plurality of layers, the classified image data of the pictures of each of the layers is encoded, and a video stream including the encoded image data of the pictures of each of the layers is generated. A container of a predetermined format including the generated video stream is transmitted. Time correction information for correcting a decoding timing is inserted into the encoded image data and/or a packet containing the encoded image data in association with each of the encoded image data of the pictures of a predetermined layer or a layer lower than the predetermined layer.

20 Claims, 30 Drawing Sheets

(51) Int. Cl.
   *H04N 21/6336* (2011.01)
   *H04N 19/70* (2014.01)
   *H04N 21/2343* (2011.01)
   *H04N 21/845* (2011.01)
   *H04N 21/854* (2011.01)
   *H04N 19/36* (2014.01)

(52) U.S. Cl.
   CPC . *H04N 21/2343* (2013.01); *H04N 21/234327* (2013.01); *H04N 21/234381* (2013.01); *H04N 21/6336* (2013.01); *H04N 21/8451* (2013.01); *H04N 21/85406* (2013.01)

(58) Field of Classification Search
   CPC ... H04N 21/234381; H04N 21/234327; H04N 21/2343; H04N 21/6336
   USPC .................................................. 375/240.27
   See application file for complete search history.

(56) References Cited

U.S. PATENT DOCUMENTS

| | | |
   |---|---|---|
   | 2010/0091837 A1 | 4/2010 | Zhu et al. |
   | 2011/0110436 A1* | 5/2011 | Schierl ........... H04N 21/234327 375/240.26 |
   | 2013/0162770 A1 | 6/2013 | Arakawa et al. |
   | 2014/0125762 A1 | 5/2014 | Tsukagoshi |

FOREIGN PATENT DOCUMENTS

| | | |
   |---|---|---|
   | JP | 2008-245325 A | 10/2008 |
   | JP | 2010-516085 A | 5/2010 |
   | JP | 2012-095320 A | 5/2012 |
   | WO | WO 2012/023281 A1 | 2/2012 |

OTHER PUBLICATIONS

Sullivan, et al., "Overview of the High Efficiency Video Coding (HEVC) Standard," IEEE Transactions on Circuits and Systems for Video Technology, vol. 22, No. 12, Dec. 2012 (20 Pages).
   Extended European Search Report dated Apr. 18, 2017 in European Patent Application No. 14859268.6.
   Thomas Schierl, et al., "Scalable Video Coding over RTP and MPEG-2 Transport Stream in Broadcast and IPTV Channels", IEEE Wireless Communications, XP055329350A, Oct. 30, 2009, pp. 64-71.
   "Test of ISO/IEC FDIS 14496-15: Information Technology—Coding of audio-visual objects Part 15: Carriage of NAL Unit Structured Video in the ISO Base Media File Format" MPEG Meeting, XP30020228A, Jun. 8, 2013, 118 Pages.
   Japan Office Action dated Nov. 27, 2018 in Japanese Application No. 2015-54488 (with English translation), 5 pages.
   Kazushi Sato; "On inter-layer prediction enabling/disabling for HEVC scalable extensions", Joint Collaborative Team on Video Coding (JCT-VC) of ITU-T SG 16 WP 3 and ISO/IEC JTC 1/SC 29/WG 11, 11th Meeting: Shanghai, CN, Oct. 10-19, 2012, 7 pages.

* cited by examiner

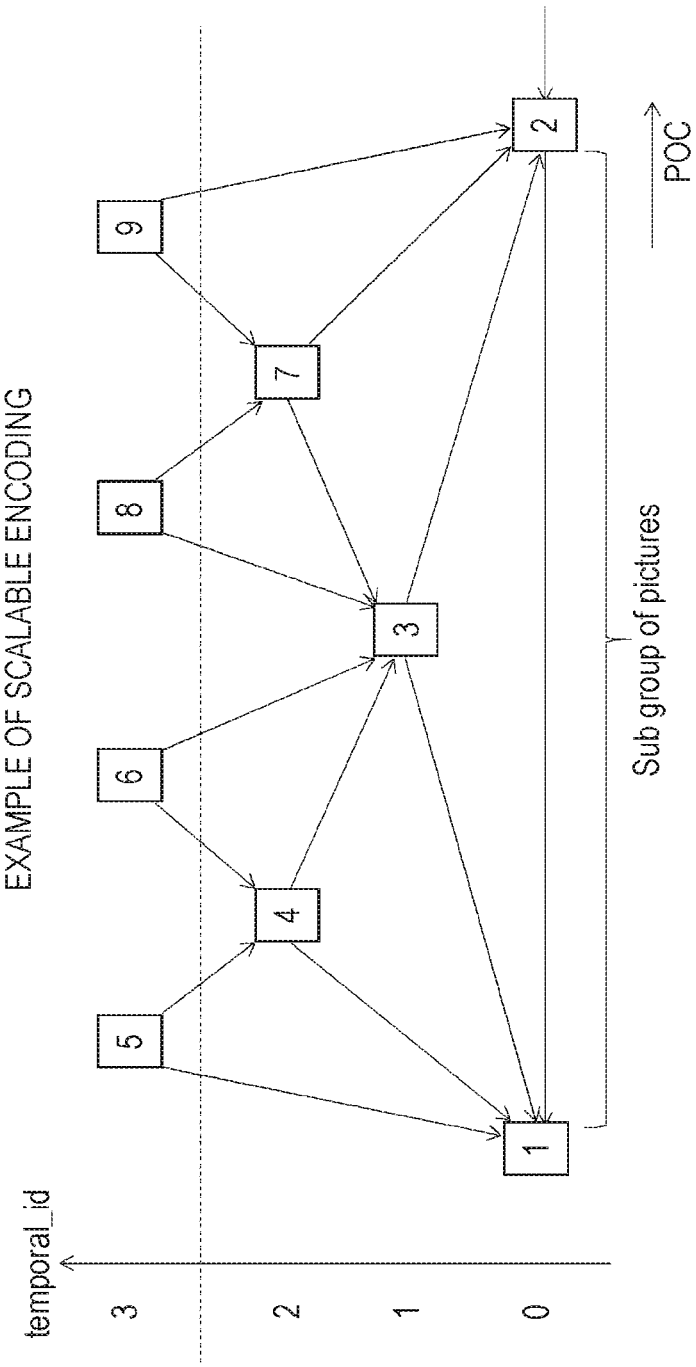

FIG. 4

(a)
```
nal_unit_header( ) {                    Descriptor
        forbidden_zero_bit              f(1)
        nal_unit_type                   u(6)
        nuh_layer_id                    u(6)
        nuh_temporal_id_plus1           u(3)
}
```

(b)
Semantics

Forbidden_zero_bit          (1bit)
    0 IS MANDATORY.
Nal_unit_type               (6bits)
    VALUE IS DECIDED FOR EACH OF FOLLOWING NALunits.

| AUD | VPS | SPS | PPS | PSEI | SLICE | SSEI | EOS |

Nuh_layer_id                (6bits)
    0 IS ASSUMED.
Nuh_temporal_id_plus1       (3bits)
    INDICATES temporal_id.
    HAS VALUE (1 TO 7) OBTAINED BY ADDING 1.
    VALUE OF temporal_id IS 0 TO 6.

FIG. 5

FIRST Picture OF GOP
| AUD | VPS | SPS | PPS | PSEI | SLICE | SSEI | EOS |

PICTURES OTHER THAN FIRST Picture OF GOP
| AUD | PPS | PSEI | SLICE | SSEI | EOS |

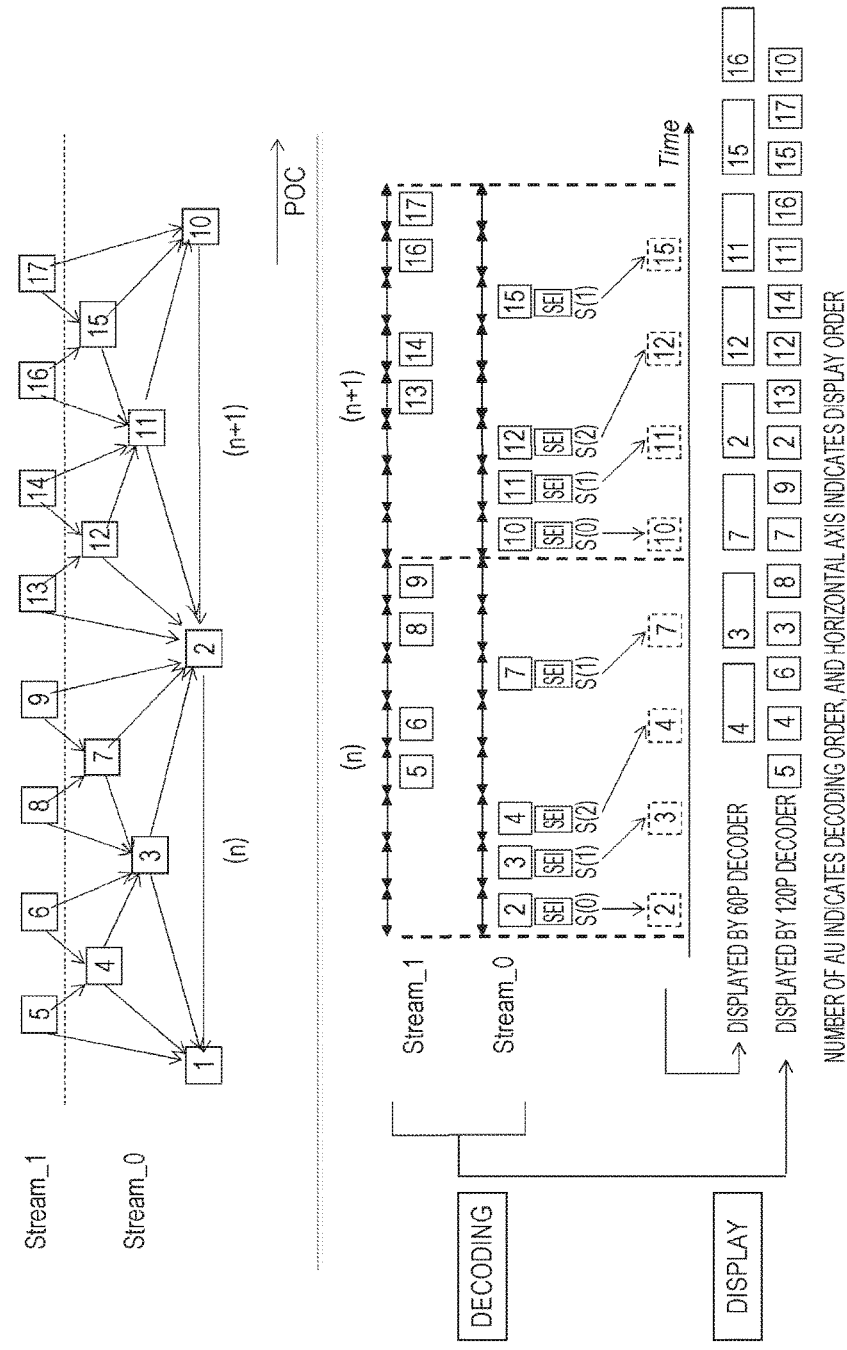

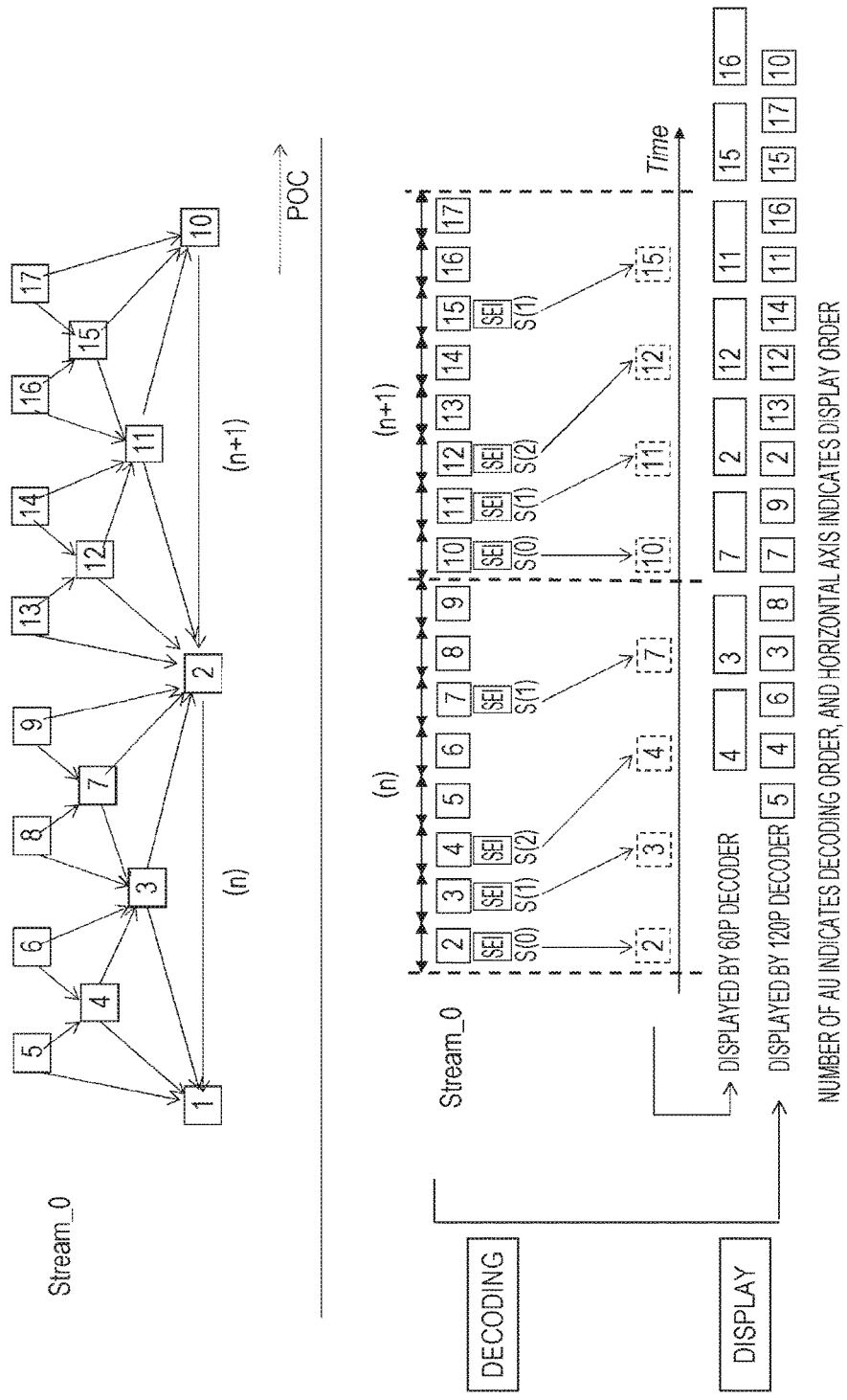

| Syntax | No. of Bits | Format |
|---|---|---|
| user_data_unregistered (size) { | | |
| uuid_iso_iec_11578 | 128 | uimslbf |
| for( i = 16; i < payloadSize; i++ ) | | |
| user_data_payload_byte | 8 | bslbf |
| } | | |

(b)

| Syntax | No. of Bits | Format |
|---|---|---|
| Timing_adjustment information () { | | |
| userdata_id | 16 | uimslbf |
| Timing_adjustment information_length | 8 | bslbf |
| adjustment_type | 2 | bslbf |
| reserved | 6 | 0x3f |
| au_cpb_removal_delay_offset | 24 | simsbf |
| } | | |

FIG. 12 semantics userdata_id (16 bits)
  ATTACH ID OF PREDETERMINED USER DATA THERETO.

Timing_adjustment_information_length (8bits)
  INDICATE BYTE NUMBER (COUNT FROM PRESENT ELEMENT TO NEXT ELEMENT) OF "Timing_adjustment information_length."

adjustment_type (2bits)
  INDICATE TYPE OF CORRECTION OF DECODING TIMING.
  01   ENCODING IS PERFORMED IN UNITS OF 120p, AND CORRECTION AT RECEPTION SIDE IS CORRECTION
       TO TIME INTERVALS OF Low rate (60p) FROM High rate (120p). (OFFSET FOR THAT IS ENCODED BY
       au_cpb_removal_delay_offset.)
  10   ENCODING IS PERFORMED IN UNITS OF 60p, AND CORRECTION AT RECEPTION SIDE IS CORRECTION
       TO TIME INTERVALS OF High rate (120p) FROM Low rate (60p). (OFFSET FOR THAT IS ENCODED BY
       au_cpb_removal_delay_offset.)
  others   reserved au_cpb_removal_delay_offset (24bits)   DIFFERENCE VALUE WITH "cpb_removal_delay" OF TARGET AU (90KHz ACCURACY)
  CLOCK BASE INDICATING DISPLAY PERIOD OF TIME OF CORRESPONDING slice OR PICTURE IS INDICATED BY num_units_in_tick,
  FOR EXAMPLE, FRAME INTERVAL IS UNDERSTOOD TO BE 120Hz BASED ON SCALING VALUE OF TIME INFORMATION INDICATED
  BY time_scale, AND NUMBER OF CORRECTED FRAMES (WITH CODE) OF DECODING TIME IN THIS UNIT IS EXPRESSED BY 90kHz.

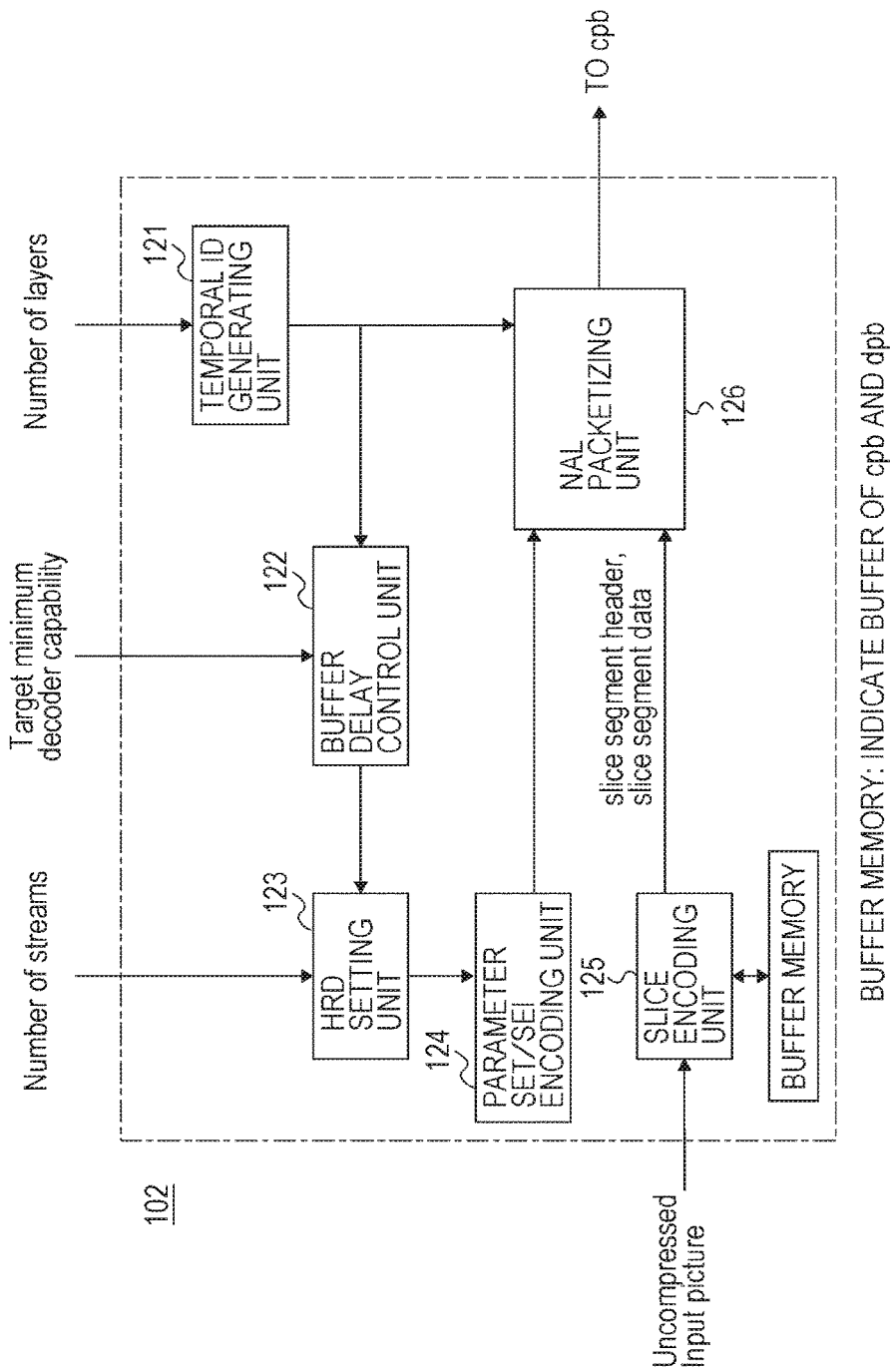

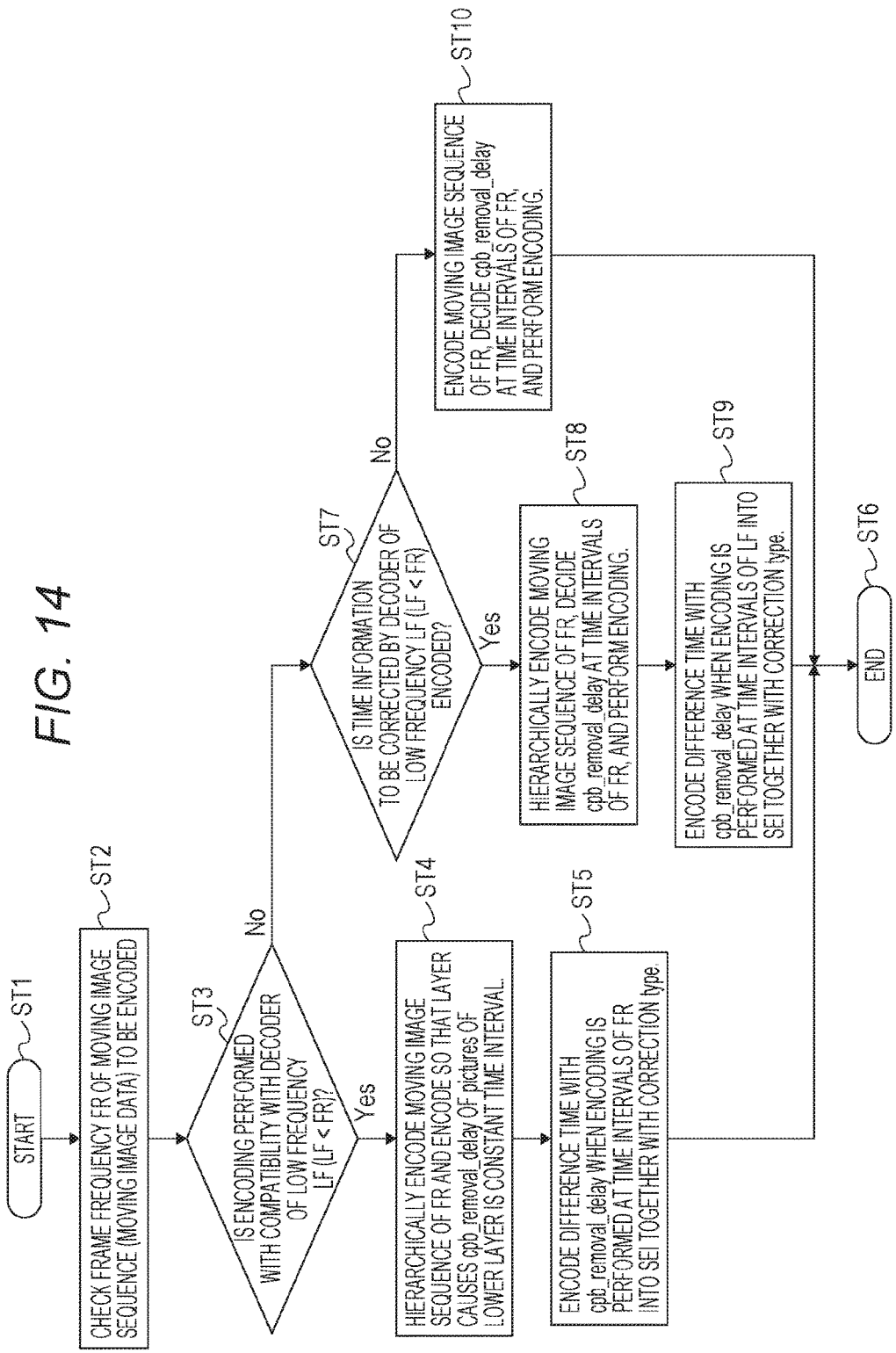

FIG. 15

| Syntax | No. of Bits | Format |
|---|---|---|
| pes_extension_field_data (){ | | |
|    start_sync_byte | 8 | bslbf |
|    extension_field_type | 8 | bslbf |
|    adjustment_type | 2 | bslbf |
|    reseved | 6 | 0x3f |
|    offset_to_DTS | 24 | umslbf |
| } | | |

FIG. 16 semantics start_sync_byte (8bits)
    CODE VALUE INDICATING START OF extension field
extension_field_type (8bits)
    0x03        SUPPLY CORRECTION INFORMATION RELATED TO DECODING TIMING.
    others      reserved
adjustment_type (2bits)
    INDICATE TYPE OF CORRECTION OF DECODING TIMING.
    01          ENCODING IS PERFORMED IN UNITS OF 120p, AND CORRECTION AT RECEPTION SIDE IS CORRECTION
                TO TIME INTERVALS OF Low rate (60p) FROM High rate (120p). (OFFSET FOR THAT IS ENCODED BY
                au_cpb_removal_delay_offset.)
    10          ENCODING IS PERFORMED IN UNITS OF 60p, AND CORRECTION AT RECEPTION SIDE IS CORRECTION
                TO TIME INTERVALS OF High rate (120p) FROM Low rate (60p). (OFFSET FOR THAT IS ENCODED BY
                au_cpb_removal_delay_offset.)
    others      reserved
offset_to_DTS (24bits)
    INDICATE OFFSET DIFFERENCE VALUE (WITH 90kHz UNIT CODE) FROM DTS ATTACHED TO PES header
    OR PTS IN CASE OF AU HAVING NO DTS.

FIG. 17

| Syntax | No. of Bits | Format |
|---|---|---|
| Temporal_extension_descriptor ( ) { | | |
|     Temporal_extension_descriptor_tag | 8 | uimslbf |
|     Temporal_extension_descriptor_length | 8 | uimslbf |
|     Temporal_extension_existed | 1 | bslbf |
|     adjustment_type | 2 | bslbf |
|     reseved | 5 | 0x3f |
| } | | |

FIG. 18 semantics

| Temporal_extension_descriptor_tag (8bits) | tag VALUE INDICATING temporal_extension_descriptor |
|---|---|
| Temporal_extension_existed (1bit) | |
| 1 | offset_to_DTS IS ATTACHED TO PES extension. THERE IS timing_adjustment SEI IN VIDEO STREAM. |
| 0 | offset_to_DTS IS NOT NECESSARILY ATTACHED TO PES extension. THERE IS NO GUARANTEE THAT THERE IS timing_adjustment SEI IN VIDEO STREAM. |

| adjustment_type (2bits) | |
|---|---|
| | INDICATE TYPE OF CORRECTION OF DECODING TIMING. |
| 01 | ENCODING IS PERFORMED IN UNITS OF 120p, AND CORRECTION AT RECEPTION SIDE IS CORRECTION TO TIME INTERVALS OF Low rate (60p) FROM High rate (120p). (OFFSET FOR THAT IS ENCODED BY au_cpb_removal_delay_offset.) |
| 10 | ENCODING IS PERFORMED IN UNITS OF 60p, AND CORRECTION AT RECEPTION SIDE IS CORRECTION TO TIME INTERVALS OF High rate (120p) FROM Low rate (60p). (OFFSET FOR THAT IS ENCODED BY au_cpb_removal_delay_offset.) |
| others | reserved |

FIG. 19

| | | |
|---|---|---|
| HEVC_descriptor() { | | |
|   descriptor_tag | 8 | uimsbf |
|   descriptor_length | 8 | uimsbf |
|   profile_space | 2 | uimsbf |
|   tier_flag | 1 | bslbf |
|   profile_idc | 5 | uimsbf |
|   reserved_zero_16bits | 16 | bslbf |
|   level_idc | 8 | uimsbf |
|   profile_compatibility_indication | 32 | bslbf |
|   temporal_layer_subset_flag | 1 | bslbf |
|   HEVC_still_present_flag | 1 | bslbf |
|   HEVC_24hr_picture_present_flag | 1 | bslbf |
|   frame_packing_arrangement_SEI_present_flag | 1 | bslbf |
|   reserved | 4 | bslbf |
|   if ( temporal_layer_subset_flag == '1') { | | |
|     temporal_id_min | 3 | uimsbf |
|     reserved | 5 | bslbf |
|     temporal_id_max | 3 | uimsbf |
|     reserved | 5 | bslbf |
|   } | | |
| } | | |

TRANSMISSION DEVICE, TRANSMISSION METHOD, RECEPTION DEVICE, AND RECEPTION METHOD

TECHNICAL FIELD

The present technology relates to a transmission device, a transmission method, a reception device, and a reception method. More particularly, the present technology relates to a transmission device that performs scalable encoding on image data of pictures configuring moving image data and transmits encoded image data.

BACKGROUND ART

When compressed moving image services are provided through broadcasting or on a network, an upper limit of a reproducible frame frequency is restricted according to decoding capabilities of receivers. Thus, at a service provision side, it is necessary to restrict its service to services of a low frame frequency or provide services of a plurality of high and low frame frequencies at the same time in view of the reproduction capabilities of receivers which are in widespread use.

In order to support the services of the high frame frequency, the cost of the receivers increases, and it is an obstructive factor in an early spread. In the early stages, cheap receivers dedicated for the services of the low frame frequency have been spread, and if the service provision side starts services of the high frame frequency in the future, it is difficult to view them without a new receiver, and it is an obstructive factor in distributing new services.

For example, temporal scalability performed by performing scalable encoding on image data of pictures configuring moving image data in H.265/High Efficiency Video Coding (HEVC) has been proposed (see Non Patent Document 1). A reception side can identify a layer of each picture based on a temporal ID (temporal_id) inserted into a header of a Network Abstraction Layer (NAL) unit and perform selective decoding of up to a layer corresponding to a decoding capability.

CITATION LIST

Patent Document

Non Patent Document 1: Gary J. Sullivan, Jens-Rainer Ohm, Woo-Jin Han, Thomas Wiegand, "Overview of the High Efficiency Video Coding (HEVC) Standard," IEEE TRANSACTIONS ON CIRCUITS AND SYSTEMS FOR VIDEO TECHNOLOGY, VOL. 22, NO. 12, pp. 1649-1668, DECEMBER 2012

SUMMARY OF THE INVENTION

Problems to be Solved by the Invention

It is an object of the present technology to enable the reception side to perform excellent reproduction whether or not the reception side supports a high frame rate (HFR).

Solutions to Problems

A concept of the present technology lies in a transmission device, including:

an image encoding unit that classifies image data of pictures configuring moving image data into a plurality of layers, encodes the classified image data of the pictures of each of the layers, and generates a video stream including the encoded image data of the pictures of each of the layers;

a transmitting unit that transmits a container of a predetermined format including the video stream; and a correction information inserting unit that inserts time correction information for correcting a decoding timing into the encoded image data and/or a packet containing the encoded image data in association with each of the encoded image data of the pictures of a predetermined layer or a layer lower than the predetermined layer.

In the present technology, the image encoding unit encodes image data of pictures configuring moving image data, and generates a video stream. In this case, the image data of the pictures configuring the moving image data is classified into a plurality of layers and encoded. The transmitting unit transmits a container of a predetermined format including a video stream generated as described above. For example, the container may be a transport stream (MPEG-2 TS) employed in a digital broadcasting standard. Further, for example, the container may be a container having MP4 used in the Internet delivery or any other format.

The correction information inserting unit inserts the time correction information for correcting the decoding timing into the encoded image data and/or the packet containing the encoded image data in association with each of the encoded image data of the pictures of a predetermined layer or a layer lower than the predetermined layer. For example, the container may be the transport stream, and the correction information inserting unit may insert the time correction information into the extension field of the PES packet.

For example, the image encoding unit may perform the encoding so that the decoding intervals of the encoded image data of the pictures configuring the moving image data are equal intervals, and the time correction information may be information for correcting the decoding timing so that the decoding intervals of the encoded image data of the pictures of the predetermined layer or the layer lower than the predetermined layer are equal intervals.

Further, for example, the image encoding unit may perform the encoding so that the decoding timings of the encoded image data of the pictures of the layer higher than the predetermined layer are the same decoding timings when the decoding intervals of the encoded image data of the pictures configuring the moving image data are equal intervals, and the decoding intervals of the encoded image data of the pictures of the predetermined layer or the layer lower than the predetermined layer are equal intervals, and the time correction information may be information for correcting the decoding timing so that the decoding timings of the encoded image data of the pictures of the predetermined layer or the layer lower than the predetermined layer are the same as the decoding timings when the encoded image data of the pictures configuring the moving image data are equal intervals.

As described above, in the present technology, the time correction information for correcting the decoding timing may be inserted into the encoded image data and/or the packet containing the encoded image data and transmitted. Thus, at the reception side, it is possible to correct the decoding timing of the encoded image data of the pictures of the predetermined layer or the layer lower than the predetermined layer using the time correction information according to whether only the encoded image data of the pictures of the predetermined layer or the layer lower than the predetermined layer is decoded or the encoded image data of the pictures of all the layers are decoded. Thus, it is possible to perform excellent reproduction regardless of whether or not the reception side supports the high frame rate.

Further, in the present technology, for example, when a frame rate by the pictures configuring the moving image data is a first frame rate, and a frame rate by the pictures of the predetermined layer or the layer lower than the predetermined layer is a second frame rate, the second frame rate may be ½ times of the first frame rate. In this case, for example, when the first frame rate is 120 Hz, the second frame rate is 60 Hz.

Further, in the present technology, for example, the image encoding unit may divide the plurality of layers into a predetermined number (2 or more) of layer sets and generate the predetermined number of video streams including the divided encoded image data of the pictures of each of the layer sets, and the predetermined layer or the layer lower than the predetermined layer and the layer higher than the predetermined layer may belong to different layer sets. In this case, at the reception side, it is possible to extract the encoded image data of the pictures of the predetermined layer or the layer lower than the predetermined layer through filtering of the video stream.

Further, the present technology may be configured that, for example, type information identifying whether the time correction information is a first type or a second type is added to the time correction information, the first type indicates that the video stream is encoded so that the decoding intervals of the encoded image data of the pictures configuring the moving image data are equal intervals, and the time correction information is the information for correcting the decoding timing so that the decoding intervals of the encoded image data of the pictures of the predetermined layer or the layer lower than the predetermined layer are equal intervals, and the second type indicates that the video stream is encoded so that the decoding timings of the encoded image data of the pictures of a layer higher than the predetermined layer are the same decoding timings when the decoding intervals of the encoded image data of the pictures configuring the moving image data are equal intervals, and the decoding intervals of the encoded image data of the pictures of the predetermined layer or the layer lower than the predetermined layer are equal intervals, and the time correction information is the information for correcting the decoding timing so that the decoding timings of the encoded image data of the pictures of the predetermined layer or the layer lower than the predetermined layer are the same as the decoding timings when the encoded image data of the pictures configuring the moving image data are equal intervals.

As described above, since the type information is added to the time correction information, the reception side can accurately detect whether the type of the time correction information is the first type or the second type and can appropriately correct the decoding timing of the encoded image data of the pictures of the predetermined layer or the layer lower than the predetermined layer.

For example, in the case of the first type, at the reception side, when only the encoded image data of the pictures of the predetermined layer or the layer lower than the predetermined layer is decoded, the decoding timing of the encoded image data of the pictures of the predetermined layer or the layer lower than the predetermined layer is corrected using the time correction information. Accordingly, the decoding intervals of the encoded image data of the pictures of the predetermined layer or the layer lower than the predetermined layer become equal intervals.

Further, in the case of the second type, at the reception side, when the encoded image data of the pictures of all the layers is decoded, the decoding timing of the encoded image data of the pictures of the predetermined layer or the layer lower than the predetermined layer is corrected using the time correction information. Accordingly, the decoding intervals of the encoded image data of the pictures of all the layers become equal intervals.

Further, in the present technology, for example, an identification information inserting unit that inserts identification information identifying that the time correction information is inserted into the encoded image data and/or a packet containing the encoded image data into the layer of the container may further be provided. For example, the container may be the transport stream, and the identification information inserting unit may insert the identification information into the video elementary stream loop arranged in association with the video stream under the program map table as the descriptor. In this case, at the reception side, it is possible to identify that the time correction information is inserted based on the identification information without processing the encoded image data or the packet containing the encoded image data.

Further, another concept of the present technology lies in a reception device, including: a receiving unit that receives a video stream including encoded image data of pictures of each of layers obtained such that image data of pictures configuring moving image data are classified into a plurality of layers and encoded; and processing unit that processes the video stream, wherein time correction information for correcting a decoding timing is inserted into the encoded image data and/or a packet containing the encoded image data in association with each of the encoded image data of the pictures of a predetermined layer or a layer lower than the predetermined layer among the encoded image data of the pictures of the layers included in the video stream.

In the present technology, the receiving unit receives the video stream. The video stream includes a video stream including the encoded image data of the pictures obtained such that the image data of the pictures configuring the moving image data are classified into a plurality of layers and encoded. The time correction information for correcting the decoding timing is inserted into the encoded image data and/or the packet containing the encoded image data in association with each of the encoded image data of the pictures of the predetermined layer or the layer lower than the predetermined layer among the encoded image data of the pictures of the layers included in the video stream. The processing unit processes the video stream.

For example, the video stream may be encoded so that the decoding intervals of the encoded image data of the pictures configuring the moving image data are equal intervals, and the time correction information may be information for correcting the decoding timing so that the decoding intervals of the encoded image data of the pictures of the predetermined layer or the layer lower than the predetermined layer are equal intervals.

Further, for example, the video stream may be encoded so that the decoding timings of the encoded image data of the pictures of a layer higher than the predetermined layer are the same decoding timings when the decoding intervals of the encoded image data of the pictures configuring the moving image data are equal intervals, and the decoding intervals of the encoded image data of the pictures of the predetermined layer or the layer lower than the predetermined layer are equal intervals, and the time correction information may be information for correcting the decoding timing so that the decoding timings of the encoded image data of the pictures of the predetermined layer or the layer lower than the predetermined layer are the same as the decoding timings when the encoded image data of the pictures configuring the moving image data are equal intervals.

Further, another concept of the present technology lies in a reception device, including: a receiving unit that receives a container of a predetermined format including a video stream including encoded image data of pictures of each of layers obtained such that image data of pictures configuring moving image data are classified into a plurality of layers and encoded; and an image decoding processing unit that obtains image data by selectively taking the encoded image data of the pictures of the layer according to a decoding capability in a buffer from the video stream and decoding the encoded image data of the pictures taken in the buffer, wherein time correction information for correcting a decoding timing is inserted into the encoded image data and/or a packet containing the encoded image data in association with each of the encoded image data of the pictures of a predetermined layer or a layer lower than the predetermined layer among the encoded image data of the pictures of the layers included in the video stream, and the image decoding processing unit corrects the decoding timings of the encoded image data of the pictures of the predetermined layer or the layer lower than the predetermined layer using the time correction information according to whether only the encoded image data of the pictures of the predetermined layer or the layer lower than the predetermined layer is decoded or the encoded image data of the pictures of all the layers is decoded.

In the present technology, the receiving unit receives a container of a predetermined format. The container includes the video stream including the encoded image data of pictures obtained such that the image data of the pictures configuring the moving image data are classified into a plurality of layers and encoded. The image decoding processing unit obtains the image data by selectively taking the encoded image data of the pictures of the layer according to the decoding capability in the buffer from the video stream and decoding the encoded image data of the pictures taken in the buffer.

For example, when the encoded image data of the pictures of the predetermined layer or the layer lower than the predetermined layer or all the layers taken in the buffer are included in a plurality of video streams, the image decoding processing unit may combine the encoded image data of the pictures into one stream in a decoding timing order based on decoding timing information and take the one stream in the buffer.

The time correction information for correcting the decoding timing is inserted into the encoded image data and/or the packet containing the encoded image data in association with each of the encoded image data of the pictures of a predetermined layer or a layer lower than the predetermined layer among the encoded image data of the pictures of the layers included in the video stream. The image decoding processing unit corrects the decoding timings of the encoded image data of the pictures of the predetermined layer or the layer lower than the predetermined layer using the time correction information according to whether only the encoded image data of the pictures of the predetermined layer or the layer lower than the predetermined layer is decoded or the encoded image data of the pictures of all the layers is decoded.

For example, the video stream may be encoded so that the decoding intervals of the encoded image data of the pictures configuring the moving image data are equal intervals, the time correction information may be information for correcting the decoding timing so that the decoding intervals of the encoded image data of the pictures of the predetermined layer or the layer lower than the predetermined layer are equal intervals, and the image decoding processing unit may correct the decoding timings of the encoded image data of the pictures of the predetermined layer or the layer lower than the predetermined layer using the time correction information when only the encoded image data of the pictures of the predetermined layer or the layer lower than the predetermined layer is decoded.

Further, for example, the video stream may be encoded so that the decoding timings of the encoded image data of the pictures of a layer higher than the predetermined layer are the same decoding timings when the decoding intervals of the encoded image data of the pictures configuring the moving image data are equal intervals, and the decoding intervals of the encoded image data of the pictures of the predetermined layer or the layer lower than the predetermined layer are equal intervals, the time correction information may be information for correcting the decoding timing so that the decoding timings of the encoded image data of the pictures of the predetermined layer or the layer lower than the predetermined layer are the same as the decoding timings when the encoded image data of the pictures configuring the moving image data are equal intervals, and the image decoding processing unit may correct the decoding timings of the encoded image data of the pictures of the predetermined layer or the layer lower than the predetermined layer using the time correction information when the encoded image data of the pictures of all the layers is decoded.

As described above, in the present technology, the decoding timings of the encoded image data of the pictures of the predetermined layer or the layer lower than the predetermined layer are corrected using the time correction information inserted into the encoded image data and/or the packet containing the encoded image data according to whether only the encoded image data of the pictures of the predetermined layer or the layer lower than the predetermined layer is decoded or the encoded image data of the pictures of all the layers is decoded. Thus, it is possible to perform excellent reproduction regardless whether or not the high frame rate is supported.

The present technology may be configured that type information identifying whether the time correction information is a first type or a second type is added to the time correction information, the first type indicates that the video stream is encoded so that the decoding intervals of the encoded image data of the pictures configuring the moving image data are equal intervals, and the time correction information is the information for correcting the decoding timing so that the decoding intervals of the encoded image data of the pictures of the predetermined layer or the layer lower than the predetermined layer are equal intervals, the second type indicates that the video stream is encoded so that the decoding timings of the encoded image data of the pictures of a layer higher than the predetermined layer are the same decoding timings when the decoding intervals of the encoded image data of the pictures configuring the moving image data are equal intervals, and the decoding intervals of the encoded image data of the pictures of the predetermined layer or the predetermined layer are equal intervals, and the time correction information is the information for correcting the decoding timing so that the decoding timings of the encoded image data of the pictures of the predetermined layer or the layer lower than the predetermined layer are the same as the decoding timings when the encoded image data of the pictures configuring the moving image data are equal intervals, and the image decoding processing unit performs switching between correction of the decoding timing performed using the time correction information when only the encoded image data of the pictures of the predetermined layer or the layer lower than the predetermined layer is decoded and correction of the decoding timing performed using the time correction information when the encoded image data of the pictures of all the layers is decoded based on the type information added to the time correction information.

Effects of the Invention

According to the present technology, the reception side can perform excellent reproduction regardless of whether or not the reception side supports a high frame rate. The effect described herein is not necessarily limited and may include any effect described in the present disclosure.

BRIEF DESCRIPTION OF DRAWINGS

FIG. 3 is a diagram illustrating an example of scalable encoding performed by an encoder.

FIGS. 4(a) and 4(b) are diagrams illustrating an exemplary structure of a NAL unit header and content of main parameters in the exemplary structure.

FIG. 5 is a diagram for describing a configuration of encoded image data of each picture by HEVC.

FIG. 6 is a diagram illustrating an example of a decoding timing of each picture when two video streams, that is, a base stream (Stream_0) and an enhancement stream (Stream_1) are generated.

FIG. 7 is a diagram illustrating an example of a decoding timing of each picture when one video stream, that is, a base stream (Stream_0) is generated.

FIGS. 11(a) and 11(b) are diagrams illustrating an exemplary structure of an interface for inserting a timing adjustment SEI and an exemplary structure of timing adjustment information.

FIG. 12 is a diagram illustrating content of main information in an exemplary structure of timing adjustment information.

FIG. 13 is a block diagram illustrating an exemplary configuration of an encoder.

FIG. 14 is a diagram illustrating an example of a process flow of an encoder.

FIG. 15 is a diagram illustrating an exemplary structure of PES extension field data.

FIG. 16 is a diagram illustrating content of main information in an exemplary structure of PES extension field data.

FIG. 17 is a diagram illustrating an exemplary structure of a temporal extension descriptor.

FIG. 18 is a diagram illustrating content of main information in an exemplary structure of a temporal extension descriptor.

FIG. 19 is a diagram illustrating an exemplary structure of an HEVC descriptor.

MODE FOR CARRYING OUT THE INVENTION

Hereinafter, modes (hereinafter, referred to as "embodiments") for carrying out the invention will be described. The description will proceed in the following order.

1. Embodiments
2. Modified examples
1.<Embodiments>
[Transceiving System]

Figure 1:
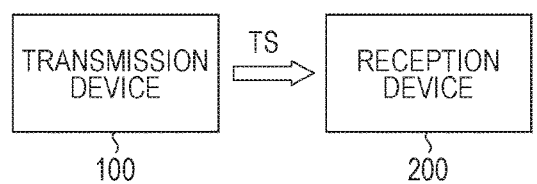
FIG. 1 is a block diagram illustrating an exemplary configuration of a transceiving system according to an embodiment.

FIG. 1 illustrates an exemplary configuration of a transceiving system 10 according to an embodiment. The transceiving system 10 includes a transmission device 100 and a reception device 200.

The transmission device 100 transmits a transport stream TS serving as a container through a broadcast wave. The transport stream TS includes a video stream including encoded image data of each picture obtained such that image data of pictures configuring moving image data is classified into a plurality of layers and encoded. In this case, for example, encoding is performed according to H.264/AVC, H.265/HEVC, or the like so that a referenced picture belongs to its own layer and/or a layer lower than its own layer.

Here, the transport stream TS includes one or more video streams. When a plurality of video streams are included, a plurality of layers are divided into a predetermined number (two or more) of layer sets, and a predetermined number of video streams including encoded image data of pictures of each divided layer set are generated. In this case, for example, when a plurality of layers are divided into a predetermined number of layer sets, a plurality of layers are included in the lowest layer set, and one layer is included in a layer set positioned to be higher than the lowest layer set. Through this division, for example, when the reception side has a decoding capability capable of processing encoded image data of pictures of a plurality of layers included in the lowest layer set, the reception side can select only the video stream having the encoded image data of the pictures of the lowest layer set, take the selected video stream in a buffer, and perform a decoding process.

Layer identification information identifying an associated layer is added to the encoded image data of the pictures of each layer for each picture. In this embodiment, the layer identification information ("nuh_temporal_id_plus1" indicating temporal_id) is arranged in a header portion of a NAL unit (nal_unit) of each picture. As the layer identification information is added as described above, the reception side can identify a layer of each picture in the layer of the NAL unit and can selectively extract encoded image data of a predetermined layer or a layer lower than the predetermined layer and perform the decoding process.

In this embodiment, the time correction information for correcting the decoding timing is inserted into the encoded image data and the PES packet containing the encoded image data in association with each encoded image data of the pictures of the predetermined layer or the layer lower than the predetermined layer. Based on the time correction information, the reception side can correct the decoding timing of the encoded image data of the pictures of the predetermined layer or the layer lower than the predetermined layer and can perform excellent reproduction regardless of whether or not the reception side supports the high frame rate. The time correction information is considered to be inserted into only the encoded image data or the PES packet.

As the time correction information, there are a first type and a second type. The first type of the time correction information is applied when encoding is performed so that decoding intervals of the encoded image data of the pictures configuring the moving image data are equal intervals. In this case, the encoded image data of the pictures of the predetermined layer or the layer lower than the predetermined layer and the encoded image data of the pictures of the layer higher than the predetermined layer may be included in different video streams or may be included in the same video stream. In other words, in this case, not only a configuration of a plurality of video streams but also a configuration of a single video stream is possible. The first type of the time correction information is information for correcting the decoding timing so that the decoding intervals of the encoded image data of the pictures of the predetermined layer or the layer lower than the predetermined layer are equal intervals.

The second type of the time correction information is applied when encoding is performed so that the decoding timings of the encoded image data of the pictures of the layer higher than the predetermined layer are the same decoding timings as when the decoding intervals of the encoded image data of the pictures configuring the moving image data are equal intervals, and the decoding intervals of the encoded image data of the pictures of the predetermined layer or the layer lower than the predetermined layer are equal intervals. In this case, it is necessary to include the encoded image data of the pictures of the predetermined layer or the layer lower than the predetermined layer and the encoded image data of the pictures of the layer higher than the predetermined layer in different video streams. In other words, in this case, only a configuration of a plurality of video streams is possible. The first type of the time correction information is information for correcting the decoding timing so that the decoding timings of the encoded image data of the pictures of the predetermined layer or the layer lower than the predetermined layer are the same as the decoding timings when the encoded image data of the pictures configuring the moving image data are equal intervals.

In this embodiment, type identification information identifying whether the time correction information is the first type or the second type is added to the time correction information. Based on the identification information, the reception side can accurately detect whether the type of the time correction information is the first type or the second type and can appropriately correct the decoding timing of the encoded image data of the pictures of the predetermined layer or the layer lower than the predetermined layer. The type identification information need not be necessarily added when the type of the time correction information is given by any other means.

Further, in this embodiment, identification information identifying whether or not the time correction information gets inserted into the encoded image data or the PES packet is inserted into the layer of the transport stream TS. This configuration information is inserted into video elementary stream loops arranged in association with a video stream under a program map table as a descriptor, for example. Based on this identification information, the reception side can easily identify whether or not the time correction information gets added into the encoded image data or the PES packet without performing the decoding process on the encoded image data.

The reception device 200 receives the transport stream TS transmitted from the transmission device 100 through the broadcast wave. The reception device 200 selectively decodes encoded image data of pictures of a predetermined layer or a layer lower than the predetermined layer selected according to a decoding capability from the video streams included in the transport stream TS, and takes image data of each picture obtained by the decoding in a buffer (an uncompressed data buffer). Then, the reception device 200 reads the image data of each picture from the buffer, outputs the read image data, and performs image reproduction.

As described above, the time correction information for correcting the decoding timing is inserted into the encoded image data and the PES packet containing the encoded image data in association with each of the encoded image data of the pictures of the predetermined layer or the layer lower than the predetermined layer. Based on the time correction information, the decoding timing of the encoded image data of the pictures of the predetermined layer or the layer lower than the predetermined layer is corrected using the time correction information according to whether only the encoded image data of the pictures of the predetermined layer or the layer lower than the predetermined layer is decoded or the encoded image data of the pictures of all the layers is decoded. Thus, it is possible to perform excellent reproduction regardless of whether or not the reception side supports the high frame rate.

As described above, the type information is added to the time correction information. Thus, it is accurately detected whether the type of the time correction information is the first type or the second type, and the decoding timing of the encoded image data of the pictures of the predetermined layer or the layer lower than the predetermined layer is appropriately corrected. In other words, when the type of the time correction information is the first type, and only the encoded image data of the pictures of the predetermined layer or the layer lower than the predetermined layer is decoded, the decoding timings of the encoded image data of the pictures of the predetermined layer or the layer lower than the predetermined layer are corrected using the time correction information, and the decoding intervals of the encoded image data of the pictures of the predetermined layer or the layer lower than the predetermined layer become equal intervals. Further, for example, when the type of the time correction information is the second type, and the encoded image data of the pictures of all the layers is decoded, the decoding timings of the encoded image data of the pictures of the predetermined layer or the layer lower than the predetermined layer are corrected using the time correction information, and the decoding intervals of the encoded image data of the pictures of all the layers become equal intervals.

[Configuration of Transmission Device]

Figure 2:
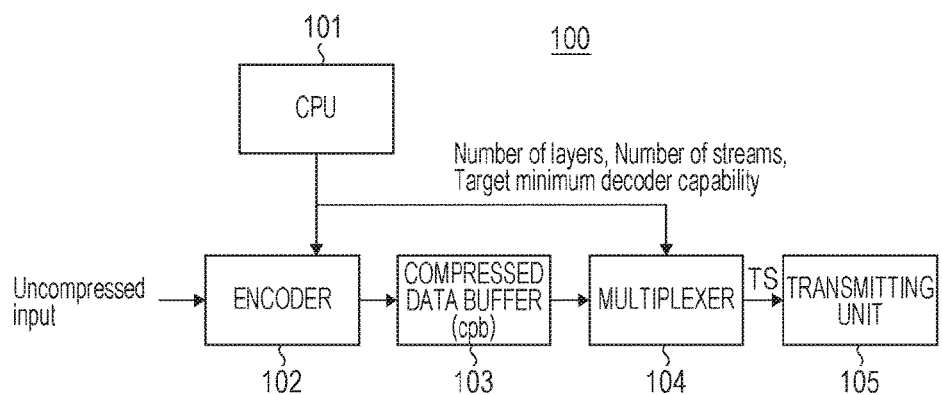
FIG. 2 is a block diagram illustrating an exemplary configuration of a transmission device.

FIG. 2 illustrates an exemplary configuration of the transmission device 100. The transmission device 100 includes a Central Processing Unit (CPU) 101, an encoder 102, a compressed data buffer (a coded picture buffer (cpb)) 103, a multiplexer 104, and a transmitting unit 105. The CPU 101 is a control unit and controls an operation of each unit of the transmission device 100.

The encoder 102 receives uncompressed moving image data, and performs scalable encoding. The encoder 102 classifies image data of pictures configuring the moving image data into a plurality of layers. Then, the encoder 102 encodes the classified image data of the pictures of each layer, and generates a video stream including the encoded image data of the pictures of each layer. The encoder 102 performs, for example, the encoding according to H.264/AVC, H.265/HEVC, or the like. At this time, the encoder 102 performs the encoding so that a picture (a referenced picture) to be referred to belongs to its own layer and/or a layer lower than its own layer.

FIG. 3 illustrates an example of scalable encoding performed by the encoder 102. In this example, image data is classified into four layers 0 to 3, and image data of pictures of each layer is encoded. A vertical axis indicates a layer. 0 to 3 are set as temporal_id (the layer identification information) arranged in the header portion of the NAL unit (nal_unit) configuring the encoded image data of the pictures of the layers 0 to 3. Meanwhile, a horizontal axis indicates a display order (a picture order of composition (POC)), and the left side is "before" in terms of a display timing, and the right side is "after" in terms of a display timing.

FIG. 4(a) illustrates an exemplary structure (syntax) of the NAL unit header, and FIG. 4(b) illustrates content (semantics) of a main parameter in the exemplary structure. A 1-bit field of "Forbidden_zero_bit" is mandatorily 0. A 6-bit field of "Nal_unit_type" indicates a NAL unit type. A 6-bit field of "Nuh_layer_id" is assumed to be 0 in this description. A 3-bit field of "Nuh_temporal_id_plus1" indicates temporal_id and has a value (1 to 7) obtained by adding 1.

Referring back to FIG. 3, each of rectangular frames indicates a picture, a number indicates an order of an encoded picture, that is, an encoding order (a decoding order at the reception side). In the example of FIG. 3, a sub group of pictures is configured with 8 pictures "2" to "9," and "2" is a first picture of the sub group of pictures. "1" is a picture of a previous sub group of pictures. A group of pictures (GOP) is configured with several sub groups of pictures.

As illustrated in FIG. 5, encoded image data of the first picture of the GOP is configured with NAL units of AUD, VPS, SPS, PPS, PSEI, SLICE, SSEI, and EOS. On the other hand, a picture other than the first picture of the GOP is configured with NAL units of AUD, PPS, PSEI, SLICE, SSEI, and EOS. The VPS can be transmitted once per sequence (GOP) together with the SPS, and the PPS can be transmitted for each picture.

Referring back to FIG. 3, solid arrows indicate a reference relation of pictures in encoding. For example, the picture "2" is a P picture and encoded with reference to the picture "1." Further, the picture "3" is a B picture and encoded with reference to the pictures "1" and "2." Similarly, the other pictures are encoded with reference to a picture that is close in the display order. A picture of the highest layer is not referred to by other pictures.

The encoder 102 generates one or more video streams. When a single video stream is generated, the encoder 102 includes encoded image data of pictures of all layers in the single video stream. On the other hand, when a plurality of video streams are generated, the encoder 102 divides a plurality of layers into a predetermined number (2 or more) of layer sets, and generates a predetermined number of video streams each of which has encoded image data of pictures of each layer set.

For example, in the example of the scalable encoding of FIG. 3, the encoder 102 divides a plurality of layers into two layer sets such that the layers 0 to 2 belong to the lowest layer set, and the layer 3 belongs to the layer set positioned to be higher than the lowest layer set as delimited by a broken line. In this case, the encoder 102 generates two video streams (encoded stream) each of which includes the encoded image data of the pictures of each layer set. For example, in the example of the scalable encoding of FIG. 3, the frame rate by the pictures of all the layers, that is, the layers 0 to 3 is 120 Hz, and the frame rate by the pictures of the layers 0 to 2 is 60 Hz.

In this case, the video stream having the encoded image data of the pictures of the lowest layer set is a base stream, and a stream type thereof is "0x24." The video stream including the encoded image data of the pictures of the layer set positioned to be higher than the lowest layer set is an enhancement stream, and a stream type thereof is "0x25" which is newly defined.

Further, when there are a plurality of enhancement streams, the stream type is also considered to be newly defined so that each of enhancement streams is identifiable instead of setting the stream types of all the enhancement streams to "0x25." For example, when there are two enhancement streams, the stream type of a first enhancement stream is set to "0x25," and the stream type of a second enhancement stream is set to "0x26."

The stream type configures identification information identifying whether each of a predetermined number of video streams is the base stream or the enhancement stream. The stream type is inserted into the layer of the transport stream TS. In other words, the stream type is inserted into the video elementary stream loop (Video ES loop) arranged in association with each of a predetermined number of video streams under a program map table (PMT).

The encoder 102 performs "first encoding" or "second encoding" with respect to the decoding timing of the encoded image data of each picture. Each encoding will be described below.

[First Encoding]

In the "first encoding," the encoder 102 performs encoding so that the decoding intervals of the encoded image data of the pictures configuring the moving image data, that is, the pictures of all the layers are equal intervals. Then, in this case, the encoder 102 inserts the time correction information for correcting the decoding timing in association with each of the encoded image data of the pictures of the predetermined layer or the layer lower than the predetermined layer that can be reproduced by the receiver of the related art that does not support the HFR.

The time correction information is the first type of the time correction information for correcting the decoding timing so that the decoding intervals of the encoded image data of the pictures of the predetermined layer or the layer lower than the predetermined layer become equal intervals. The "first encoding" is applicable not only when the encoder 102 generates a single video stream but also when the encoder 102 generates a plurality of video streams.

FIG. 6 illustrates an example of a decoding timing of each picture when the two video streams, that is, the base stream (Stream_0) and the enhancement stream (Stream_1) are generated in the example of the scalable encoding of FIG. 3. Here, the base stream (Stream_0) includes the encoded image data of the pictures of the predetermined layer or the layer lower than the predetermined layer, that is, the layers 0 to 2 here. The enhancement stream (Stream_1) includes the encoded image data of the pictures of the layer higher than the predetermined layer, that is, the layer 3 here.

In this case, encoding is performed so that the decoding intervals of the encoded image data of the pictures of all the layers are equal intervals as illustrated in FIG. 6. Further, time correction information S (i) for correcting the decoding timing is inserted in association with each of the encoded image data of the pictures of the layers 0 to 2 included in the base stream (Stream_0). Here, "i" indicates a correction value of the decoding timing of a 1/120 second unit. The time correction information S (i) is inserted into, for example, a timing adjustment SEI (Timing_adjustment SEI) that is newly defined.

In this case, at the reception side, for example, when a display is performed by a HFR-non supported 60P decoder (including the case of a 60P mode in a HFR-supported 120P decoder), the encoded image data of the pictures of the layers 0 to 2 included in the base stream (Stream_0) is selectively taken in the buffer, and decoding is sequentially performed at decoding intervals (see an access units (AUs) of a broken line frame) corrected to be equal intervals (1/60 seconds) based on the time correction information S (i).

In this case, at the reception side, for example, when the display is performed by the HFR-supported 120P decoder, the pictures of the layers 0 to 2 included in the base stream (Stream_0) and the pictures of the layer 3 included in the enhancement stream (Stream_1) are combined into one stream in the decoding order, taken in the buffer, and sequentially decoded at the decoding intervals of equal intervals (1/120 seconds).

FIG. 7 illustrates an example of a decoding timing of each picture when one video stream of the base stream (Stream_0) is generated in the example of the scalable encoding of FIG. 3. Here, the base stream (Stream_0) includes the encoded image data of the pictures of all the layers, that is, the layers 0 to 3 here.

In this case, encoding is performed so that the decoding intervals of the encoded image data of the pictures of all the layers are equal intervals as illustrated in FIG. 7. Similarly to the example of FIG. 6, the time correction information S (i) for correcting the decoding timing is inserted in association with each of the encoded image data of the pictures of the layers 0 to 2 included in the base stream (Stream_0).

In this case, at the reception side, for example, when the display is performed by the HFR-non supported 60P decoder (including the case of the 60P mode in the HFR-supported 120P decoder), the encoded image data of the pictures of the layers 0 to 2 among the layers 0 to 3 included in the base stream (Stream_0) is selectively taken in the buffer, and sequentially decoded at the decoding intervals (see the access units (AUs) of a broken line frame) corrected to be equal intervals (1/60 seconds) based on the time correction information S (i).

In this case, at the reception side, for example, when the display is performed by the HFR-supported 120P decoder, the pictures of the layers 0 to 3 included in the base stream (Stream_0) are taken in the buffer and sequentially decoded at the decoding intervals of equal intervals (1/120 seconds).

Figure 8:
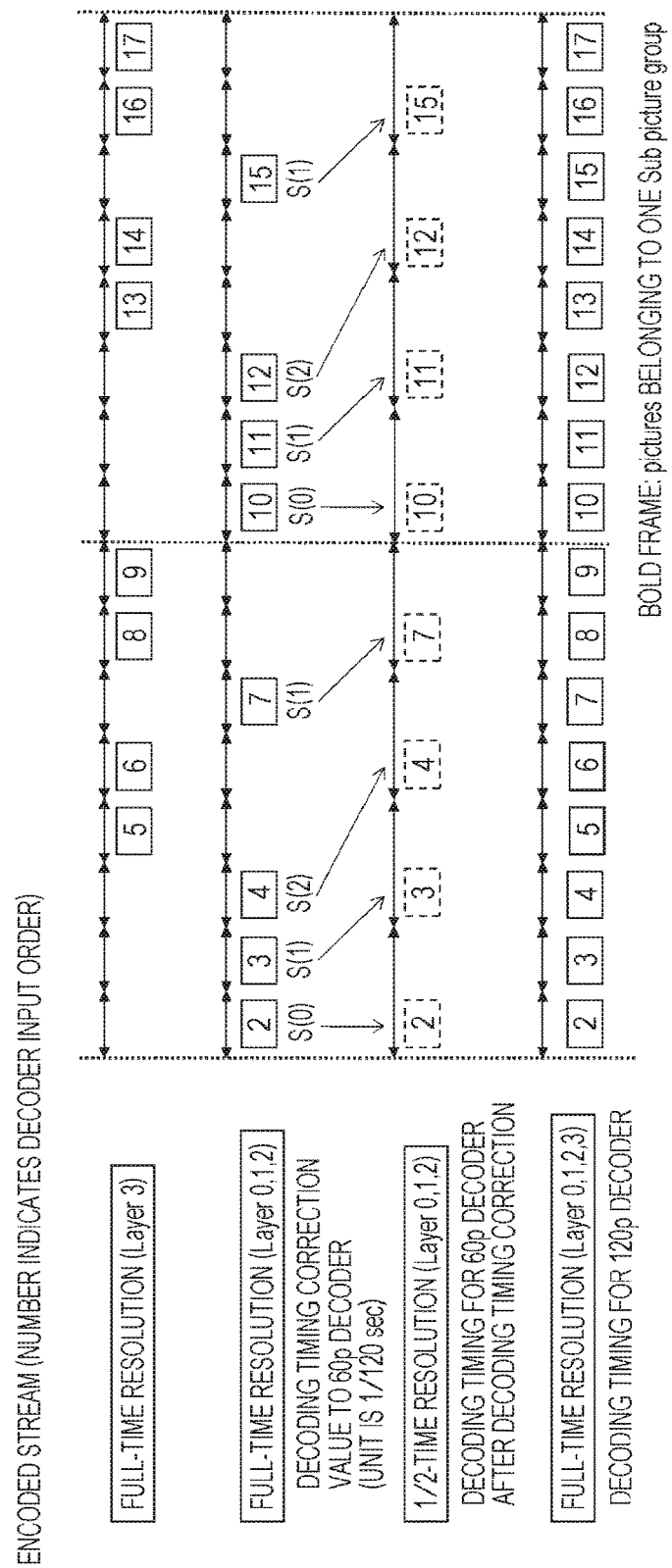
FIG. 8 is a diagram illustrating a first type of correction information S (i) inserted in association with encoded image data of each picture of a predetermined layer or a layer (a lower layer) lower than the predetermined layer when "first encoding" is performed.

FIG. 8 illustrates the correction information S (i) inserted in association with each of the encoded image data of the pictures of the predetermined layer or the layer (lower layer) lower than the predetermined layer when the "first encoding" is performed in the example of the scalable encoding of FIG. 3.

The time correction information S (i) is inserted in association with each of the encoded image data of the pictures of the layers 0 to 2 serving as a ½-time resolution portion for 60p decoding among the layers 0 to 3 of a full-time resolution. In this case, a correction value i for an access unit (picture) of "2" is set to "0," the correction value i for an access unit (picture) of "3" is set to "1," the correction value i for an access unit (picture) of "4" is set to "2," and the correction value i for an access unit (picture) of "7" is set to "1." In each of subsequent sub group of pictures (GOP), the same is repeated.

At the reception side, when the display is performed by the 60p decoder, the encoded image data of the pictures of the layers 0 to 2 serving as the ½-time resolution portion is taken in the buffer and decoded. At this time, as indicated by the access units (AUs) of the broken line frame, the decoding timings of the encoded image data of the pictures are corrected to be equal intervals (1/60 seconds) based on the time correction information S (i). Further, at the reception side, when the display is performed by the 120p decoder, the encoded image data of the pictures of 0 to 3 of the full-time resolution is taken in the buffer and decoded at equal intervals (1/120 seconds) according to the original decoding timings.

[Second Encoding]

In the "second encoding," the encoder 102 performs encoding so that the decoding intervals of the encoded image data of the pictures of the predetermined layer or the layer lower than the predetermined layer that can be reproduced by the receiver of the related art that does not support the HFR are equal intervals. In the "second encoding," the encoder 102 performs encoding so that the decoding timings of the encoded image data of the pictures of the layer higher than the predetermined layer are the same timings as when encoding is performed so that the decoding intervals of the encoded image data of the pictures configuring the moving image data, that is, the pictures of all the layers are equal intervals.

Further, in this case, similarly to the "first encoding," the encoder 102 inserts the time correction information for correcting the decoding timing in association with each of the encoded image data of the pictures of the predetermined layer or the layer lower than the predetermined layer that can be reproduced by the receiver of the related art that does not support the HFR. The time correction information is the second type of the time correction information for correcting the decoding timing so that the decoding timings of the encoded image data of the pictures of the predetermined layer or the layer lower than the predetermined layer are the same as the decoding timings when the decoding intervals of the encoded image data of the pictures configuring the moving image data, that is, the pictures of all the layers are equal intervals. The "second encoding" is applicable when the encoder 102 generates a plurality of video streams.

Figure 9:
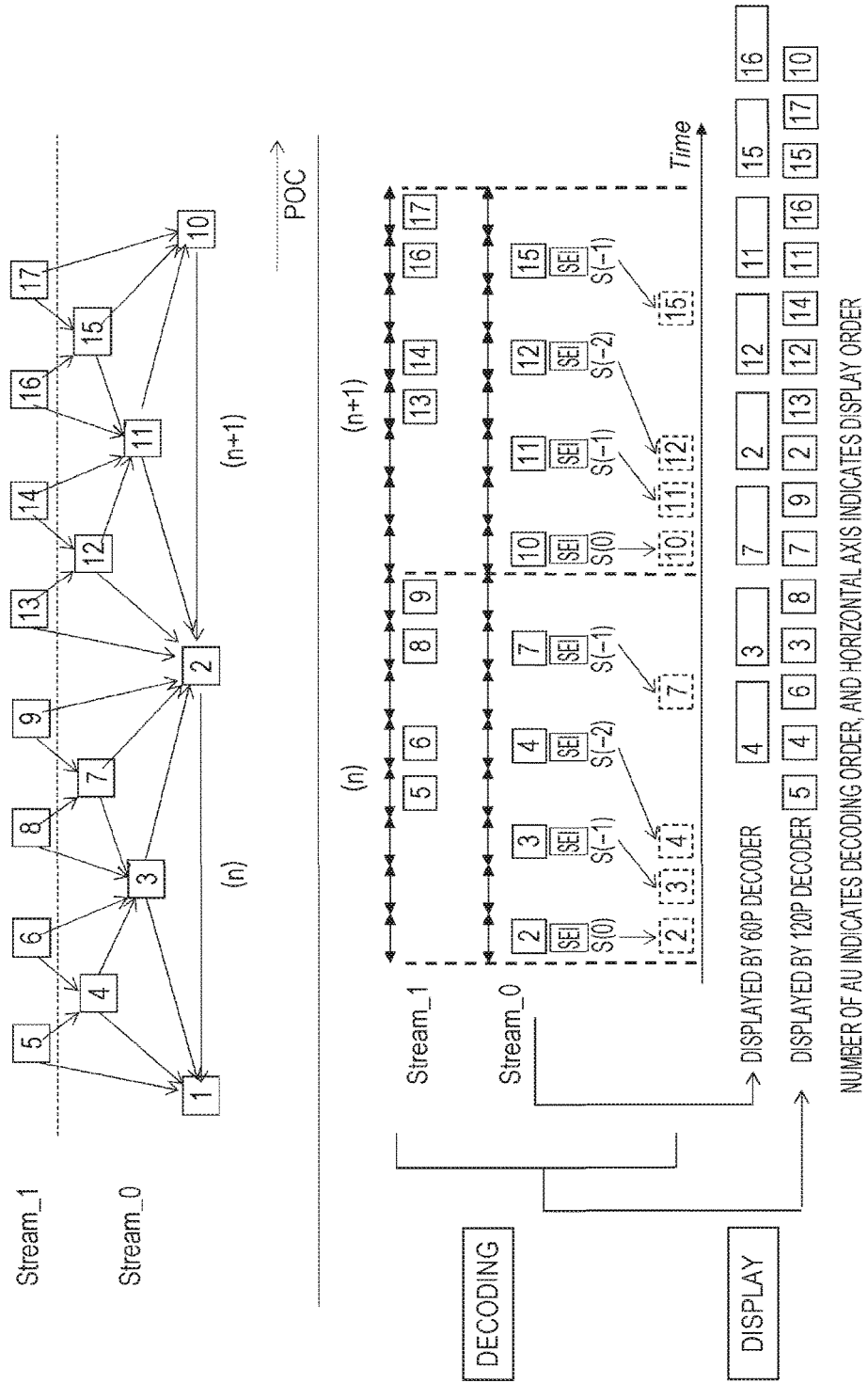
FIG. 9 is a diagram illustrating an example of a decoding timing of each picture when two video streams, that is, a base stream (Stream_0) and an enhancement stream (Stream_1) are generated.

FIG. 9 illustrates an example of a decoding timing of each picture when the two video streams, that is, the base stream (Stream_0) and the enhancement stream (Stream_1) are generated in the example of the scalable encoding of FIG. 3. Here, the base stream (Stream_0) includes the encoded image data of the pictures of the predetermined layer or the layer lower than the predetermined layer, that is, the layers 0 to 2 here. The enhancement stream (Stream_1) includes the encoded image data of the pictures of the layer higher than the predetermined layer, that is, the layer 3 here.

In this case, encoding is performed so that the decoding intervals of the encoded image data of the pictures of the layers 0 to 2 included in the base stream (Stream_0) are equal intervals as illustrated in FIG. 9. On the other hand, the decoding timing of the encoded image data of each picture of the layer 3 included in the enhancement stream (Stream_1) is encoded such that the decoding intervals of the encoded image data of the pictures configuring the moving image data, that is, the pictures of all the layers are equal intervals.

The time correction information S (i) for correcting the decoding timing is inserted in association with each of the encoded image data of the pictures of the layers 0 to 2 included in the base stream (Stream_0). Here, "i" indicates the correction value (the number of corrected frames) of the decoding timing of the 1/120 second unit. The time correction information S (i) is inserted into, for example, the timing adjustment SEI (Timing_adjustment SEI) that is newly defined.

In this case, at the reception side, for example, when the display is performed by the HFR-non supported 60P decoder (including the case of the 60P mode in the HFR-supported 120P decoder), the encoded image data of the pictures of the layers 0 to 2 included in the base stream (Stream_0) is selectively taken in the buffer and sequentially decoded at the decoding intervals of equal intervals (1/60 seconds).

In this case, at the reception side, for example, when the display is performed by the HFR-supported 120P decoder, the encoded image data of the pictures of the layer 3 included in the enhancement stream (Stream_1) and the encoded image data of the pictures of the layers 0 to 2 included in the base stream (Stream_0) (see the access units (AUs) of the broken line frame) corrected to be the same timings as when encoding is performed such that the decoding intervals of the encoded image data of the pictures of all the layers are equal intervals based on the time correction information S (i) are combined in one stream in the decoding order, taken in the buffer, and sequentially decoded at the decoding intervals of equal intervals (1/120 seconds).

Figure 10:
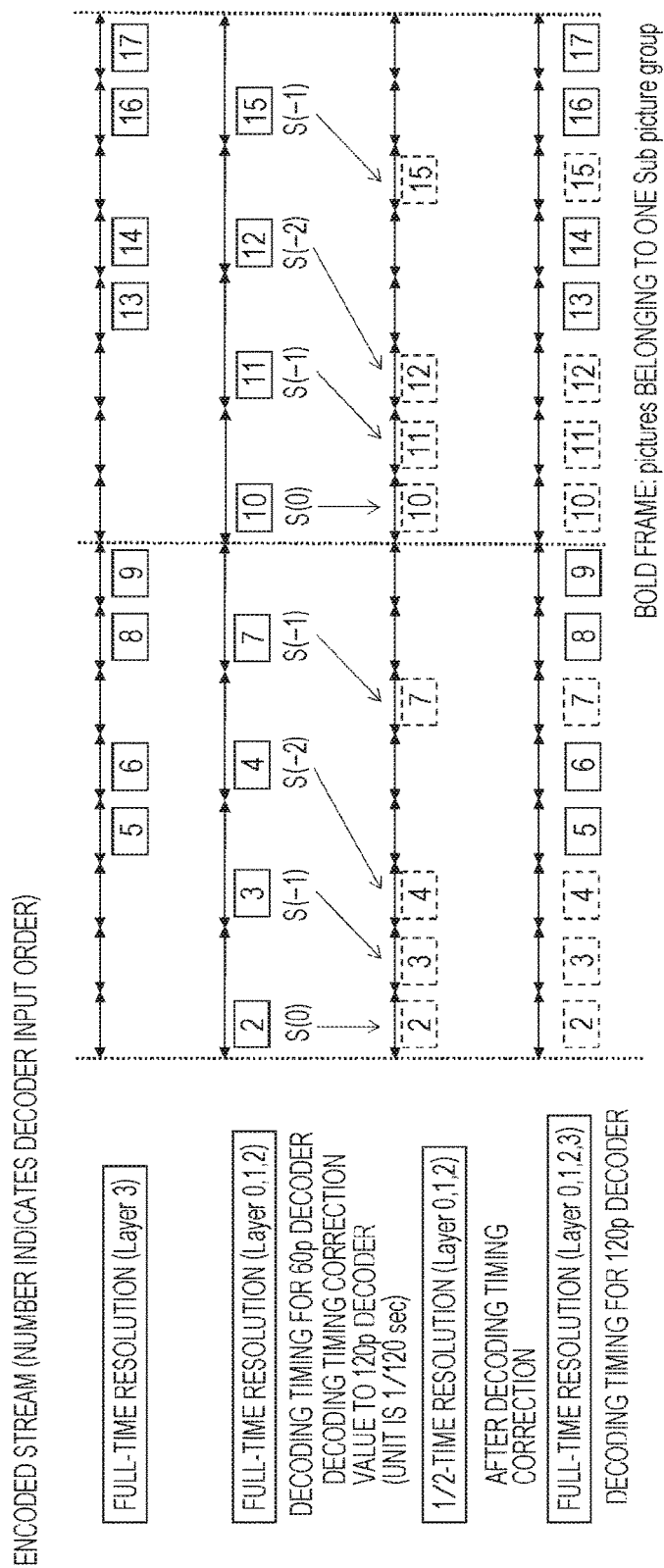
FIG. 10 is a diagram illustrating a second type of correction information S (i) inserted in association with encoded image data of each picture of a predetermined layer or a layer (a lower layer) lower than the predetermined layer when "second encoding" is performed.

FIG. 10 illustrates the correction information S (i) inserted in association with each of the encoded image data of the pictures of the predetermined layer or the layer (lower layer) lower than the predetermined layer when the "second encoding" is performed in the example of the scalable encoding of FIG. 3.

The time correction information S (i) is inserted in association with each of the encoded image data of the pictures of the layers 0 to 2 serving as the ½-time resolution portion among the layers 0 to 3 of the time resolution. In this case, the correction value i for an access unit (picture) of "2" is set to "0," the correction value i for an access unit (picture) of "3" is set to "−1," the correction value i for an access unit (picture) of "4" is set to "−2," and the correction value i for an access unit (picture) of "7" is set to "−1." In each of subsequent sub group of pictures (GOP), the same is repeated.

At the reception side, when the display is performed by the 60p decoder, the encoded image data of the pictures of the layers 0 to 2 serving as the ½-time resolution portion is taken in the buffer and decoded at equal intervals (1/60 seconds) according to the original decoding timings. At the reception side, when the display is performed by the 120p decoder, the encoded image data of the pictures of 0 to 3 of the full-time resolution is taken in the buffer and decoded. At this time, as indicated by the access units (AUs) of the broken line frame, the decoding timings of the encoded image data of the pictures of the layers 0 to 2 are corrected to be the same timings as when encoding is performed so that the decoding intervals of the encoded image data of the pictures of all the layers are equal intervals (1/120 seconds).

The encoder 102 inserts the timing adjustment SEI (Timing_adjustment SEI) including the time correction information which is newly defined as described above as one of prefix SEIs (Prefix_SEI).

FIG. 11(*a*) illustrates an exemplary structure (syntax) of an interface (I/F) for inserting the timing adjustment SEI. A field of "uuid_iso_iec_11578" has a UUID value described in "ISO/IEC 11578: 1996 Annex A." "Timing_adjustment information ( )" is inserted into a field of "user_data_payload_byte."

FIG. 11(*b*) illustrates an exemplary structure (syntax) of "Timing_adjustment information ( )." FIG. 12 illustrates content (semantics) of main information in the exemplary structure. An ID of predetermined user data is added to a 16-bit field of "userdata_id." An 8-bit field of "Timing_adjustment information_length" indicates a byte number (a count from the present element to the next element) of "Timing_adjustment information."

A 2-bit field of "adjustment_type" indicates the type of the time correction information, thus, a type of correction of the decoding timing. "01" indicates the first type. In this case, for example, it indicates that encoding is performed in units of 120p, and correction at the reception side is correction to time intervals of the low rate 60p from the high rate 120p. "10" indicates the second type. In this case, for example, it indicates that encoding is performed in units of 60p, and correction at the reception side is correction to time intervals of the high rate 120p from the low rate 60p.

A 24-bit field of "au_cpb_removal_delay_offset" indicates the time correction information. The time correction information indicates a difference value (90 KHz accuracy) with "cpb_removal_delay" of a target access unit (AU). A clock base indicating a display period of time of a corresponding slice or picture is indicated by num_units_in_tick, for example, a frame interval is understood to be 120 Hz based on a scaling value of time information indicated by "time_scale," and the number of corrected frames (with a code) of the decoding time in this unit is expressed by 90 KHz accuracy.

FIG. 13 illustrates an exemplary configuration of the encoder 102. The encoder 102 includes a temporal ID generating unit 121, a buffer delay control unit 122, a hypothetical reference decoder (HRD) setting unit 123, a parameter set/SEI encoding unit 124, a slice encoding unit 125, and an NAL packetizing unit 126.

The number-of-layers information is supplied from the CPU 101 to the temporal ID generating unit 121. The temporal ID generating unit 121 generates "temporal_id" according to the number of layers based on the number-of-layers information. For example, in the scalable encoding example of FIG. 3, "temporal_id"=0 to 3 is generated.

The buffer delay control unit 122 is supplied with information of a minimum decoding capability (a target minimum decoder capability) from the CPU 101 and supplied with temporal_id generated by the temporal ID generating unit 121. The buffer delay control unit 122 calculates "initial_cpb_removal_delay" serving as a cpb buffering (buffering) initial value and "cpb_removal_delay" and "dpb_output_delay" of each picture for each video stream.

The buffer delay control unit 122 controls "cpb_removal_delay" in the cpb buffer of each substream. The buffer delay control unit 122 performs control such that a buffer failure does not occur in the dpb buffer between the decoding timing and the display timing of the decoder.

In this case, in the "first encoding," "cpb_removal_delay" is controlled such that the decoding intervals of the encoded image data of the pictures configuring the moving image data, that is, the pictures of all the layers are equal intervals. Further, in the "second encoding," "cpb_removal_delay" is controlled such that the decoding intervals of the encoded image data of the pictures of the predetermined layer or the layer lower than the predetermined layer that can be reproduced by the receiver of the related art that does not support the HFR are equal intervals, and the decoding timings of the encoded image data of the pictures of the layer higher than the predetermined layer are the same timings as when encoding is performed such that the decoding intervals of the encoded image data of the pictures configuring the moving image data, that is, the pictures of all the layers are equal intervals.

The HRD setting unit 123 is supplied with "cpb_removal_delay" and "dpb_output_delay" of the picture of each video stream calculated by the buffer delay control unit 122 and supplied with information of the number of streams from the CPU 101. The HRD setting unit 123 performs a HRD setting based on the information.

The parameter set/SEI encoding unit 124 is supplied with the HRD setting information. The parameter set/SEI encoding unit 124 generates parameter sets of the pictures of each layer such as VPS, SPS, and PPS and various kinds of SEI according to the number of streams to be encoded.

For example, the timing adjustment SEI (Timing_adjustment SEI) is generated. Further, for example, picture timing SEI including "cpb_removal_delay" and "dpb_output_delay" is generated. Furthermore, for example, buffering period SEI including "initial_cpb_removal_time" is generated. The buffering period SEI is generated in association with the first picture (the access unit) of the GOP.

"initial_cpb_removal_time" indicates a time (an initial time) at which the encoded image data of the first picture of the GOP is extracted from the compressed data buffer (cpb) when the encoded image data of the first picture of the GOP is decoded. "cpb_removal_delay" is a time at which the encoded image data of each picture is extracted from the compressed data buffer (cpb), and the time is decided according to "initial_cpb_removal_time." Further, "dpb_output_delay" indicates a time at which it is extracted after it is decoded and input to the uncompressed data buffer (dpb).

The slice encoding unit 125 encodes the image data of the pictures of each layer, and obtains slice data (a slice segment header and slice segment data). The slice encoding unit 125 inserts "ref_idx_10_active (ref_idx_11_active)" indicating an index of a prediction destination picture of a "prediction unit" in the "slice segment header" as information indicating a prediction state in the time direction through a frame buffer. As a result, at the time of decoding, the referenced picture is decided together with the layer level indicated by temporal_id. Further, the slice encoding unit 125 inserts "short_term_ref_pic_set_idx" or "it_idx_sps" in the "slice segment header" as an index of a current slice.

The NAL packetizing unit 126 generates the encoded image data of the pictures of each layer based on the parameter set and the SEI generated by the parameter set/SEI encoding unit 124 and the slice data generated by the slice encoding unit 125, and outputs video streams (encoded stream) that corresponds in number to the number of streams.

At this time, "temporal_id" indicating the layer is added to the NAL unit header for each picture (see FIG. 4). Further, the pictures belonging to the layer indicated by "temporal_id" are grouped as a sublayer (sub_layer), and a level designation value "Level_idc" of the bit rate of each sublayer is indicated by "sublayer_level_idc" and inserted into the VPS or the SPS.

FIG. 14 illustrates an example of a process flow of the encoder 102. In step ST1, the encoder 102 starts the process and then proceeds to the process of step ST2. In step ST2, the encoder 102 checks the frame frequency FR of a moving image sequence (moving image data) to be encoded.

Then, in step ST3, the encoder 102 determines whether or not encoding compatible with a decoder (a HFR-non supported receiver) of a low frequency LF (LF<LR) is performed. In other words, it is determined whether or not the "second encoding" is performed. When this encoding is performed, the encoder 102 proceeds to a process of step ST4.

In step ST4, the encoder 102 hierarchically encodes the moving image sequence of the frame frequency FR, and performs encoding so that "cpb_removal_delay" of pictures of a lower layer corresponding to the low frequency LF is a constant time interval.

Then, in step ST5, the encoder 102 encodes the difference period of time "au_cpb_removal_delay_offset" with "cpb_removal_delay" when the encoding is performed at time intervals of the frame frequency FR into a SEI as the time correction information together with the correction type "adjustment_type." After the process of step ST5, in step ST6, the encoder 102 ends the process.

When the encoding compatible with the decoder of the low frequency LF is not performed in step ST3, the encoder 102 proceeds to a process of step ST7. In step ST7, the encoder 102 determines whether or not the time correction information to be corrected by the decoder (the HFR-non supported receiver) of the low frequency LF (LF<LR) is encoded. In other words, it is determined whether or not the "first encoding" is performed.

When the time correction information is encoded, the encoder 102 proceeds to a process of step ST8. In step ST8, the encoder 102 hierarchically encodes the moving image sequence of the frame frequency FR, decides "cpb_removal_delay" at time intervals of the frame frequency FR, and performs encoding.

Then, in step ST9, the encoder 102 encodes the difference period of time "au_cpb_removal_delay_offset" with "cpb_removal_delay" when encoding is performed at the time interval of the low frequency LF into a SEI as the time correction information together with the correction type "adjustment_type." After the process of step ST9, in step ST6, the encoder 102 ends the process.

Further, when the time correction information to be corrected by the decoder of the low frequency LF is not encoded in step ST7, the encoder 102 proceeds to a process of step ST10. In step ST10, the encoder 102 hierarchically encodes the moving image sequence of the frame frequency FR, decides "cpb_removal_delay" at the time interval of the frame frequency FR, and performs encoding. After the process of step ST10, in step ST6, the encoder 102 ends the process.

Referring back to FIG. 2, the compressed data buffer (cpb) 103 temporarily accumulates the video stream including the encoded data of the pictures of each layer which is generated by the encoder 102. The multiplexer 104 obtains the transport stream TS serving as a multiplexed stream by reading the video stream accumulated in the compressed data buffer 103, generating PES packets, generating transport packets, and performing multiplexing. The transport stream TS includes one or more video streams as described above.

The multiplexer 104 inserts the time correction information for correcting the decoding timing into a packet containing encoded image data of pictures of a predetermined layer or a layer lower than the predetermined layer for example, the PES packet in which the timing adjustment SEI (Timing_adjustment SEI) is inserted. The time correction information is the same as the time correction information inserted into the encoded image data by the encoder 102 as described above. In this embodiment, the time correction information is inserted into the PES extension field of the PES packet.

FIG. 15 illustrates an exemplary structure (syntax) of PES extension field data (pes_extension_field_data). FIG. 16 illustrates content (semantics) of main information in the exemplary structure. "PES_extension field length" is assumed to be given outside the syntax structure. An 8-bit field of "start_sync_byte" indicates a code value indicating a start of the extension field. An 8-bit field of "extension_field_type" indicates a type of the extension field. "0x03" indicates that the correction information related to the decoding timing is supplied.

A 2-bit field of "adjustment_type" indicates the type of the time correction information, thus, a type of correction of the decoding timing. "01" indicates the first type. In this case, for example, it indicates that encoding is performed in units of 120p, and correction at the reception side is correction to time intervals of the low rate 60p from the high rate 120p. "10" indicates the second type. In this case, for example, it indicates that encoding is performed in units of 60p, and correction at the reception side is correction to time intervals of the high rate 120p from the low rate 60p.

A 24-bit field of "offset_to_DTS" indicates an offset difference value (with a 90 KHz unit code) from a Decoding Time Stamp (DTS) attached to the PES header or a Presentation Time Stamp (PTS) in the case of the access unit (AU) having no DTS.

The multiplexer 104 inserts identification information indicating that the time correction information gets inserted into the encoded image data or the PES extension into the layer of the transport stream TS. This identification information is inserted into the video elementary stream loop arranged in association with each video stream under the program map table as a descriptor.

The multiplexer 104 inserts a temporal extension descriptor (Temporal_extension_descriptor) which is newly defined together with an HEVC descriptor (HEVC_descriptor). FIG. 17 illustrates an exemplary structure (syntax) of the temporal control descriptor. FIG. 18 illustrates content (semantics) of main information in the exemplary structure.

An 8-bit field of "Temporal_extension_descriptor_tag" indicates a descriptor type. Here, it indicates the temporal extension descriptor. An 8-bit field of "Temporal_extension_descriptor_length" indicates a length (size) of the descriptor, and the length of the descriptor is indicated by a subsequent byte number. Here, it indicates that the length of the descriptor is a one byte.

A 1-bit field of "Temporal_extension_existed" indicates whether or not the time correction information is inserted into the encoded image data or the PES extension. "1" indicates that "offset_to_DTS" is attached to the PES extension, and there is the timing adjustment SEI (Timing_adjustment SEI) in the encoded image data (video stream). "0" indicates that "offset_to_DTS" is not necessarily attached to the PES extension, and there is no guarantee that there is the timing adjustment SEI (Timing_adjustment SEI) in the encoded image data (video stream).

A 2-bit field of "adjustment_type" indicates the type of the time correction information, thus, a type of correction of the decoding timing. "01" indicates the first type. In this case, for example, it indicates that encoding is performed in units of 120p, and correction at the reception side is correction to time intervals of the low rate 60p from the high rate 120p. "10" indicates the second type. In this case, for example, it indicates that encoding is performed in units of 60p, and correction at the reception side is correction to time intervals of the high rate 120p from the low rate 60p.

FIG. 19 illustrates an exemplary structure (syntax) of the HEVC descriptor (HEVC_descriptor). An 8-bit field of "descriptor_tag" indicates a descriptor type, and indicates the HEVC descriptor herein. An 8-bit field of "descriptor_length" indicates a length (size) of the descriptor, and the length of the descriptor is indicated by a subsequent byte number.

An 8-bit field of "level_idc" indicates the level designation value of the bit rate. Further, when "temporal_layer_subset_flag is 1," there are a 5-bit field of "temporal_id_min" and a 5-bit field of "temporal_id_max." "temporal_id_min" indicates a value of temporal_id of the lowest layer of scalable encoded data included in a corresponding video stream. "temporal_id_max" indicates a value of temporal_id of the highest layer of scalable encoded data included in a corresponding video stream.

Figure 20:
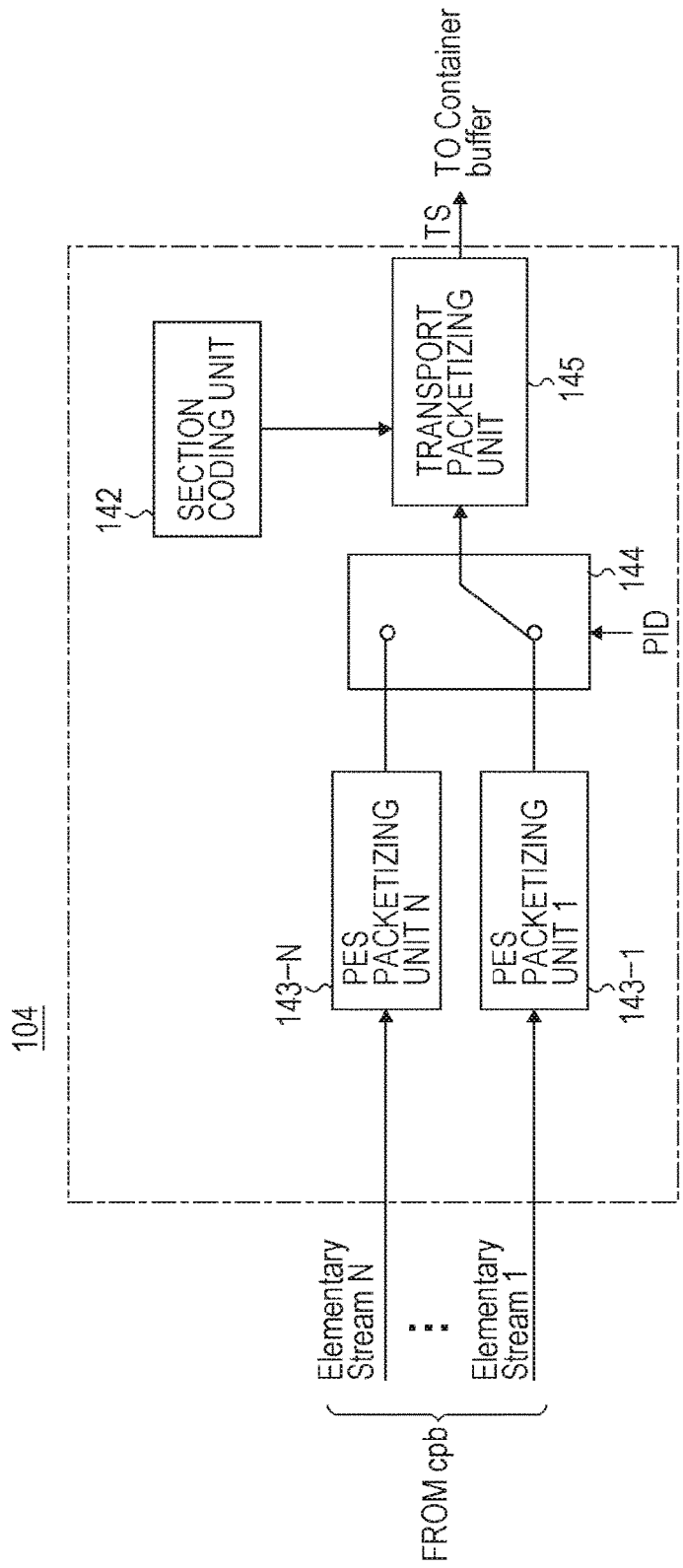
FIG. 20 is a block diagram illustrating an exemplary configuration of a multiplexer.

FIG. 20 illustrates an exemplary configuration of the multiplexer 104. The multiplexer 104 includes a section coding unit 142, PES packetizing units 143-1 to 143-N, a switch unit 144, and a transport packetizing unit 145.

The PES packetizing units 143-1 to 143-N read video streams (Elementary Streams) 1 to N accumulated in the compressed data buffer 103, and generates the PES packets. Here, at least one the base stream is included in each of the video streams 1 to N. When N is 2 or more, one base stream and one or more enhancement streams are included.

At this time, the PES packetizing units 143-1 to 143-N add time stamps such as a Decoding Time Stamp (DTS) and a Presentation Time Stamp (PTS) to the PES header based on the HRD information of the video streams 1 to N. In this case, the DTS and the PTS are generated at the accuracy synchronized with a System Time Clock (STC) time with reference to "cpu_removal_delay" and "dpb_output_delay" of each picture and arranged at a predetermined position of the PES header.

Among the PES packetizing units 143-1 to 143-N, the PES packetizing unit that deals with the video stream including the encoded image data in which there is the timing adjustment SEI (Timing_adjustment SEI) acquires "au_cpb_removal_delay_offset" serving as the time correction information and "adjustment_type" serving as the type information from the timing adjustment SEI. Then, the PES packetizing unit attaches "offset_to_DTS" serving as the time correction information and "adjustment_type" serving as the type information to the PES extension of the PES header.

The switch unit 144 selectively extracts the PES packets generated by the PES packetizing units 143-1 to 143-N based on a packet identifier (PID), and transfers the extracted PES packet to the transport packetizing unit 145. The transport packetizing unit 145 generates a TS packet in which the PES packet is included in the payload, and obtains the transport stream TS.

The section coding unit 142 generates various kinds of section data to be inserted into the transport stream TS. Information such as the number of layers and the number of streams is supplied from the CPU 101 to the section coding unit 142. The section coding unit 142 generates HEVC descriptor (HEVC_descriptor) based on the information.

Further, presence information of the timing adjustment SEI (Timing_adjustment SEI), insertion information of "offset_to_DTS" to the PES extension, or the like for each of PES packets generated by the PES packetizing units 143-1 to 143-N are supplied from the CPU 101 to the section coding unit 142. The section coding unit 142 generates the temporal extension descriptor (Temporal_extension_descriptor) based on the information.

The section coding unit 142 transfers various kinds of section data to the transport packetizing unit 145. The transport packetizing unit 145 generates the TS packet including the section data, and inserts the generated TS packet into the transport stream TS. At this time, the stream type is also inserted into the video elementary stream loop (Video ES loop) arranged in association with each video stream. In this case, the stream type of the base stream is set to "0x24," and the stream type of the enhancement stream is, for example, set to "0x25" which is newly defined.

Figure 21:
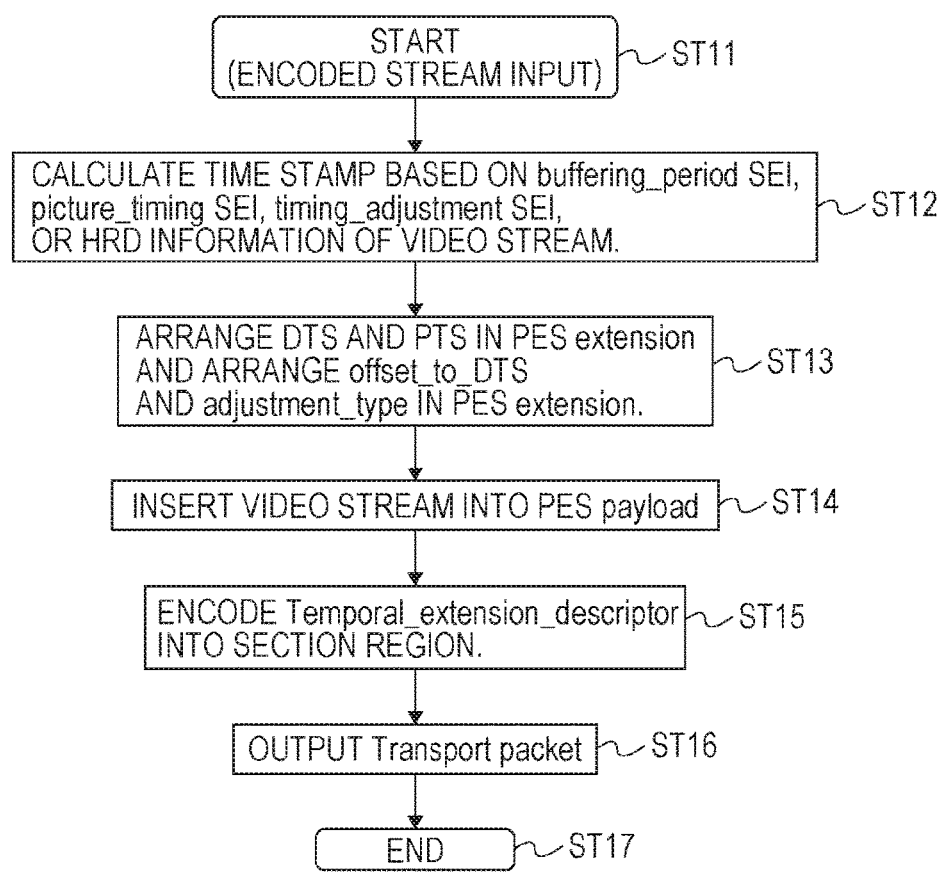
FIG. 21 is a diagram illustrating an example of a process flow of a multiplexer.

FIG. 21 illustrates a process flow of the multiplexer 104. In step ST11, the multiplexer 104 starts the process, and then proceeds to the process of step ST12. In step ST12, the multiplexer 104 calculates the time stamp based on the picture timing SEI, the buffering period SEI, the timing adjustment SEI, or the HRD information of the video stream (Elementary Stream).

Then, in step ST13, the multiplexer 104 arranges the DTS and the PTS in the PES header, and arranges "offset_to_DTS" serving as the time correction information and "adjustment_type" serving as the type information in the PES extension in association with each of the encoded image data of the pictures of the predetermined layer or the layer lower than the predetermined layer. Then, in step ST14, the multiplexer 104 inserts the video stream (Elementary Stream) into the PES payload.

Then, in step ST15, the multiplexer 104 encodes the temporal extension descriptor (Temporal_extension_descriptor) into a section region. Then, in step ST16, the multiplexer 104 converts it into the TS packet, and outputs the TS packet. In step ST17, the multiplexer 104 ends the process after the process of step ST16 ends.

Figure 22:
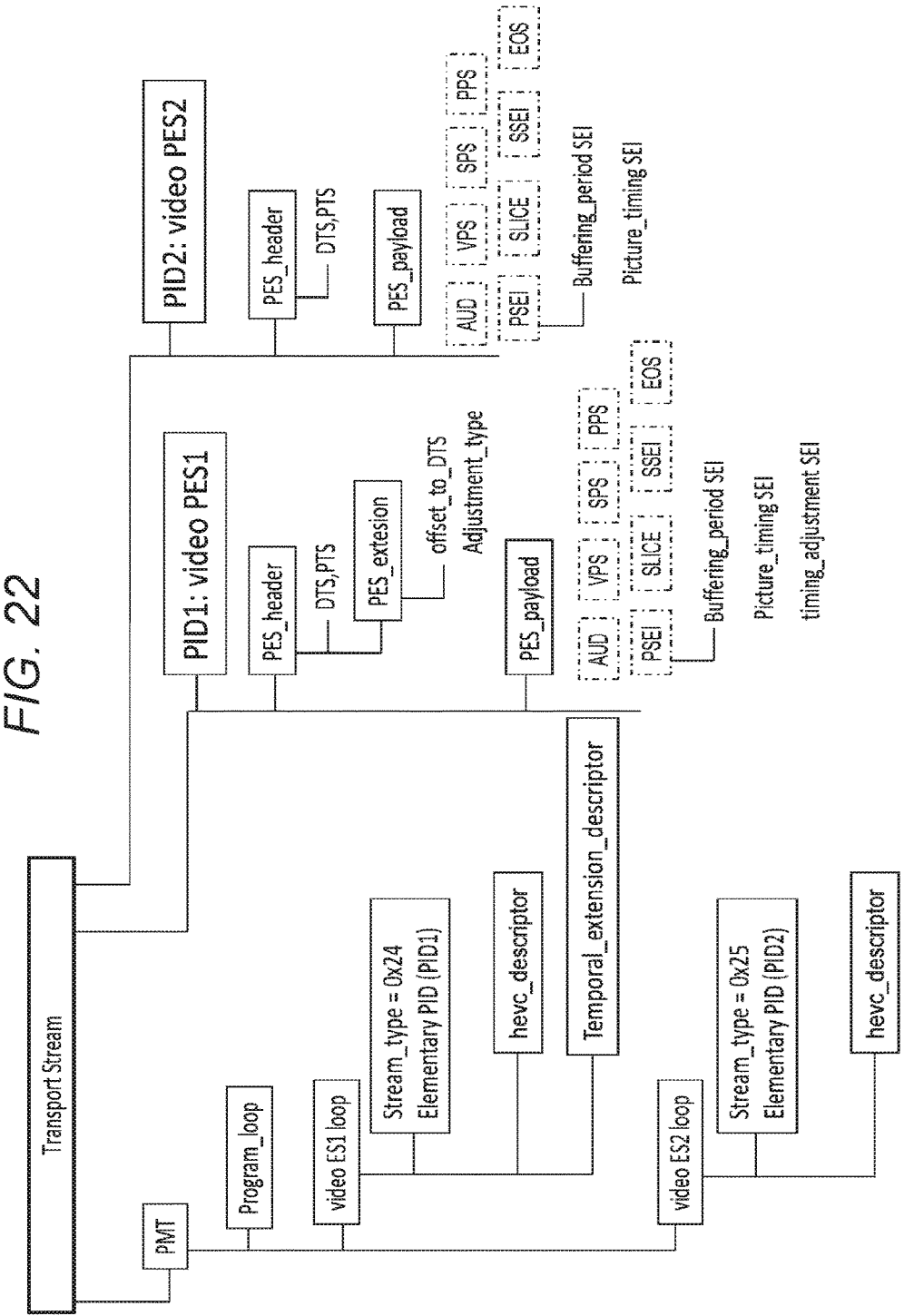
FIG. 22 is a diagram illustrating an exemplary configuration of a transport stream TS in two-stream delivery.

FIG. 22 illustrates an exemplary configuration of the transport stream TS when a certain HFR service is delivered through two streams. The two video streams, that is, the base stream and the enhancement stream are included in the transport stream TS. In other words, in this exemplary configuration, there is a PES packet "video PES1" of the base stream, and there is a PES packet "video PES2" of the enhancement stream.

"offset_to_DTS" serving as the time correction information and "adjustment_type" serving as the type information are arranged in the PES extension field of the PES header in the PES packet "video PES1" containing the encoded image data of the pictures of the predetermined layer or the layer lower than the predetermined layer. The DTS and the PTS are arranged in the PES header as well. The buffering period SEI, the picture timing SEI, and the like are inserted into the encoded image data of each picture. The timing adjustment SEI is inserted into the encoded image data of each picture contained in the PES packet "video PES1."

A Program Map Table (PMT) is included in the transport stream TS as one of Program Specific Information (PSI). The PSI is information indicating a program to which each elementary stream included in the transport stream belongs.

In the PMT, there is a program loop in which information associated with the entire program is described. Further, in the PMT, there is an elementary stream loop including information associated with each video stream. In this exemplary configuration, there is a video elementary stream loop "video ES1 loop" corresponding to the base stream, and there is a video elementary stream loop "video ES2 loop" corresponding to the enhancement stream.

Information such as the stream type and the packet identifier (PID) is arranged in "video ES1 loop" in association with the base stream (video PES1), and a descriptor describing information associated with the video stream is also arranged in "video ES1 loop." The stream type is set to "0x24" indicating the base stream. The HEVC descriptor or the temporal extension descriptor is inserted as one of the descriptors.

Information such as the stream type and the packet identifier (PID) is arranged in "video ES2 loop" in association with the enhancement stream (video PES2), and a descriptor describing information associated with the video stream are arranged in "video ES2 loop." The stream type is set to, for example, "0x25" that indicates the enhancement stream and is newly defined. The HEVC descriptor is inserted as one of the descriptors.

Figure 23:
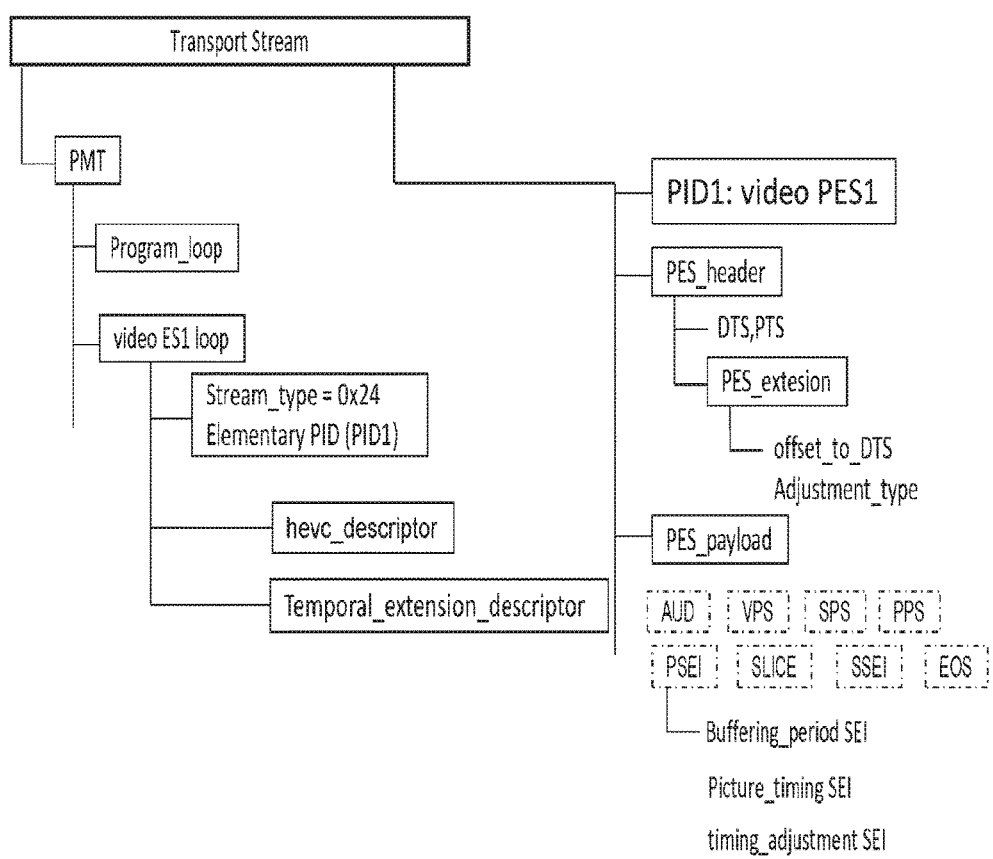
FIG. 23 is a diagram illustrating an exemplary configuration of a transport stream TS in one-stream delivery.

FIG. 23 illustrates an exemplary configuration of the transport stream TS when a certain HFR service is delivered through one stream. This transport stream TS includes only the base stream. In other words, in this exemplary configuration, there is the PES packet "video PES1" of the base stream.

"offset_to_DTS" serving as the time correction information and "adjustment_type" serving as the type information are arranged in the PES extension field of the PES header in the PES packet containing the encoded image data of the pictures of the predetermined layer or the layer lower than the predetermined layer among the PES packets "video PES1." The DTS and the PTS are arranged in the PES header as well. The buffering period SEI, the picture timing SEI, and the like are inserted into the encoded image data of each picture. The timing adjustment SEI is inserted into the encoded image data of the pictures of the predetermined layer or the layer lower than the predetermined layer among the encoded image data of each picture contained in the PES packet "video PES1."

The PMT is included in the transport stream TS as one of the PSI. The PSI is information indicating a program to which each elementary stream included in the transport stream belongs.

In the PMT, there is a program loop describing information associated with the entire program. Further, in the PMT, there is an elementary stream loop including information associated with each video stream. In this exemplary configuration, there is a video elementary stream loop "video ES1 loop" corresponding to the base stream.

"Information such as the stream type and the packet identifier (PID) is arranged in "video ES1 loop" in association with the base stream (video PES1), and a descriptor describing information associated with the video stream is also arranged in "video ES1 loop." The stream type is set to "0x24" indicating the base stream. The HEVC descriptor or the temporal extension descriptor is inserted as one of the descriptors.

Referring back to FIG. 2, the transmitting unit 105 modulates the transport stream TS, for example, according to a modulation scheme suitable for broadcasting such as QPSK/OFDM or the like, and transmits an RF modulation signal through a transmission antenna.

An operation of the transmission device 100 illustrated in FIG. 2 will briefly be described. The uncompressed moving image data is input to the encoder 102. The encoder 102 performs the scalable encoding on the moving image data. In other words, the encoder 102 classifies the image data of the pictures configuring the moving image data into a plurality of layers, encodes the plurality of layers, and generates the video streams including the encoded image data of the pictures of the respective layers. At this time, the encoding is performed so that a picture to be referred to belongs to its own layer and/or a layer lower than its own layer.

The encoder 102 generates one or more video streams. When a single video stream is generated, the video stream includes encoded image data of pictures of all the layers. On the other hand, when a plurality of video streams are generated, the encoder 102 divides a plurality of layers into a predetermined number (2 or more) of layer sets, and generates a predetermined number of video streams each of which has encoded image data of pictures of each layer set.

The encoder 102 performs "first encoding" or "second encoding" with respect to the decoding timing of the encoded image data of each picture. The "first encoding" is applicable not only when a single video stream is generated but also when a plurality of video streams are generated. On the other hand, the "second encoding" is applicable only when a plurality of video streams are generated.

In the "first encoding," encoding is performed so that the decoding intervals of the encoded image data of the pictures configuring the moving image data, that is, the pictures of all the layers are equal intervals. In the "second encoding," encoding is performed so that the decoding intervals of the encoded image data of the pictures of the predetermined layer or the layer lower than the predetermined layer that can be reproduced by the receiver of the related art that does not support the HFR are equal intervals. Further, in the "second encoding," encoding is performed so that the decoding timings of the encoded image data of the pictures of the layer higher than the predetermined layer are the same timings as when encoding is performed such that the decoding intervals of the encoded image data of the pictures configuring the moving image data, that is, the pictures of all the layers are equal intervals.

In both of the encoding, the encoder 102 inserts the time correction information for correcting the decoding timing in association with each of the encoded image data of the pictures of the predetermined layer or the layer lower than the predetermined layer that can be reproduced by the receiver of the related art that does not support the HFR. The type information identifying whether the type of the time correction information is the first type of the time correction information corresponding to the "first encoding" or the second type of the time correction information corresponding to the "second encoding" is added to the time correction information.

The first type of the time correction information is information for correcting the decoding timing so that the decoding intervals of the encoded image data of the pictures of the predetermined layer or the layer lower than the predetermined layer are equal intervals. On the other hand, the second type of the time correction information is information for correcting the decoding timing so that the decoding timings of the encoded image data of the pictures of the predetermined layer or the layer lower than the predetermined layer are the same as the decoding timing when the encoded image data of the pictures configuring the moving image data, that is, the pictures of all the layers have equal intervals.

Specifically, the encoder 102 inserts the timing adjustment SEI (Timing_adjustment SEI) that is newly defined into the encoded image data of the pictures of the predetermined layer or the layer lower than the predetermined layer. This SEI includes "au_cpb_removal_delay_offset" serving as the time correction information and "adjustment_type" serving as the type information (see FIG. 11(b)).

The video streams generated by the encoder 102 are supplied to and temporarily accumulated in the compressed data buffer (cpb) 103. The multiplexer 104 obtains the transport stream TS serving as a multiplexed stream by reading the video streams accumulated in the compressed data buffer 103, generating PES packets, generating transport packets, and performing multiplexing.

The multiplexer 104 inserts the time correction information for correcting the decoding timing into the packet containing the encoded image data of the pictures of the predetermined layer or the layer lower than the predetermined layer in which the timing adjustment SEI (Timing_adjustment SEI) is inserted, for example, the PES packet. The time correction information is the same as the time correction information inserted into the encoded image data by the encoder 102 as described above and includes the type information added thereto as well. Specifically, the multiplexer 104 adds "offset_to_DTS" serving as the time correction information and "adjustment_type" serving as the type information to the PES extension field of the PES packet (see FIG. 15).

The multiplexer 104 inserts identification information indicating that the time correction information is inserted into the encoded image data or the PES extension into the layer of the transport stream TS. Specifically, the multiplexer 104 inserts the temporal extension descriptor (Temporal_extension_descriptor) that is newly defined into the video elementary stream loop arranged in association with the video stream under the program map table (see FIG. 17).

The transport stream TS generated by the multiplexer 104 is transferred to the transmitting unit 105. The transmitting unit 105 modulates the transport stream TS, for example, according to the modulation scheme suitable for broadcasting such as QPSK/OFDM or the like, and transmits the RF modulation signal through the transmission antenna.

[Configuration of Reception Device]

Figure 24:
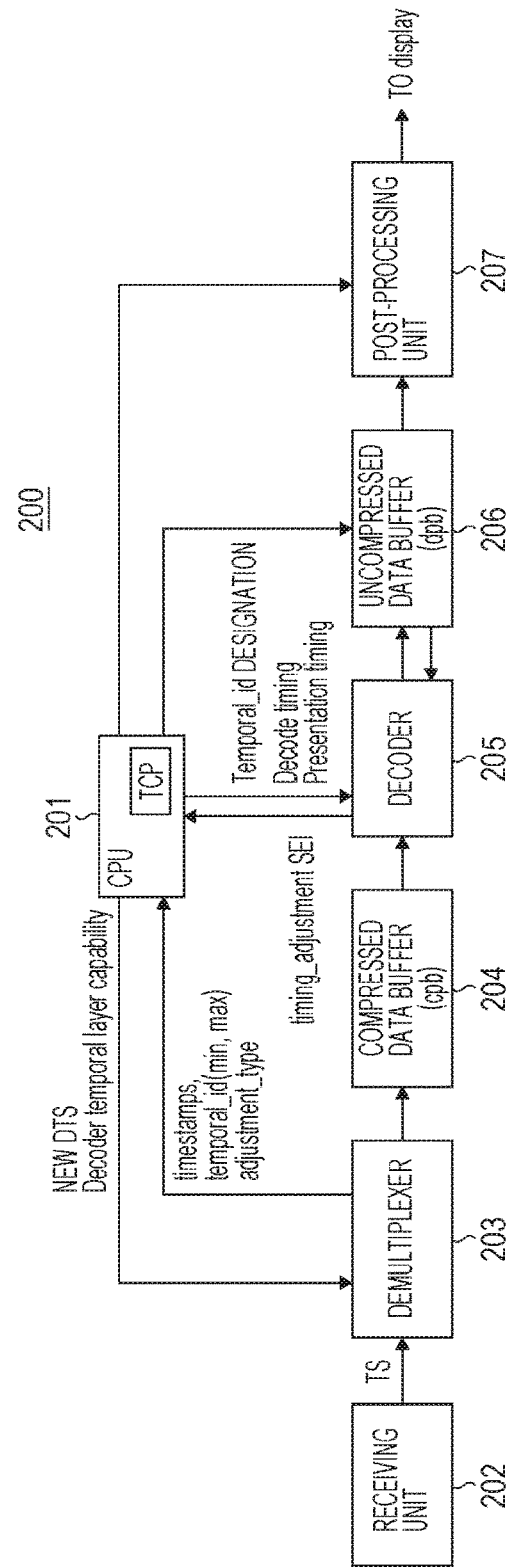
FIG. 24 is a block diagram illustrating an exemplary configuration of a reception device.

FIG. 24 illustrates an exemplary configuration of the reception device 200. The reception device 200 includes a CPU 201, a receiving unit 202, a demultiplexer 203, and a compressed data buffer (cpb) 204. The reception device 200 further includes a decoder 205, an uncompressed data buffer (dpb) 206, and a post-processing unit 207.

The CPU 201 configures a control unit, and controls operations of the respective units of the reception device 200. The CPU 201 is equipped with a timing control processor (TCP) and controls the decoding timing and the display timing in units of access units (pictures).

The receiving unit 202 demodulates the RF modulation signal received through the reception antenna, and acquires the transport stream TS. The demultiplexer 203 selectively extracts the encoded image data of the pictures of the layer from the transport stream TS according to the decoding capability (decoder temporal layer capability), and transfers the extracted encoded image data to the compressed data buffer (cpb) 204.

The demultiplexer 203 performs a process according to the "first encoding" or the "second encoding" that has been performed on the video stream included in the transport stream TS. The demultiplexer 203 determines whether the encoding is the "first encoding" or the "second encoding" based on the type of the time correction information included in, for example, the temporal extension descriptor. In other words, the demultiplexer 203 determines the encoding to be the "first encoding" when the time correction information is the first type, and determines the encoding to be the "second encoding" when the time correction information is the second type.

Figure 25:
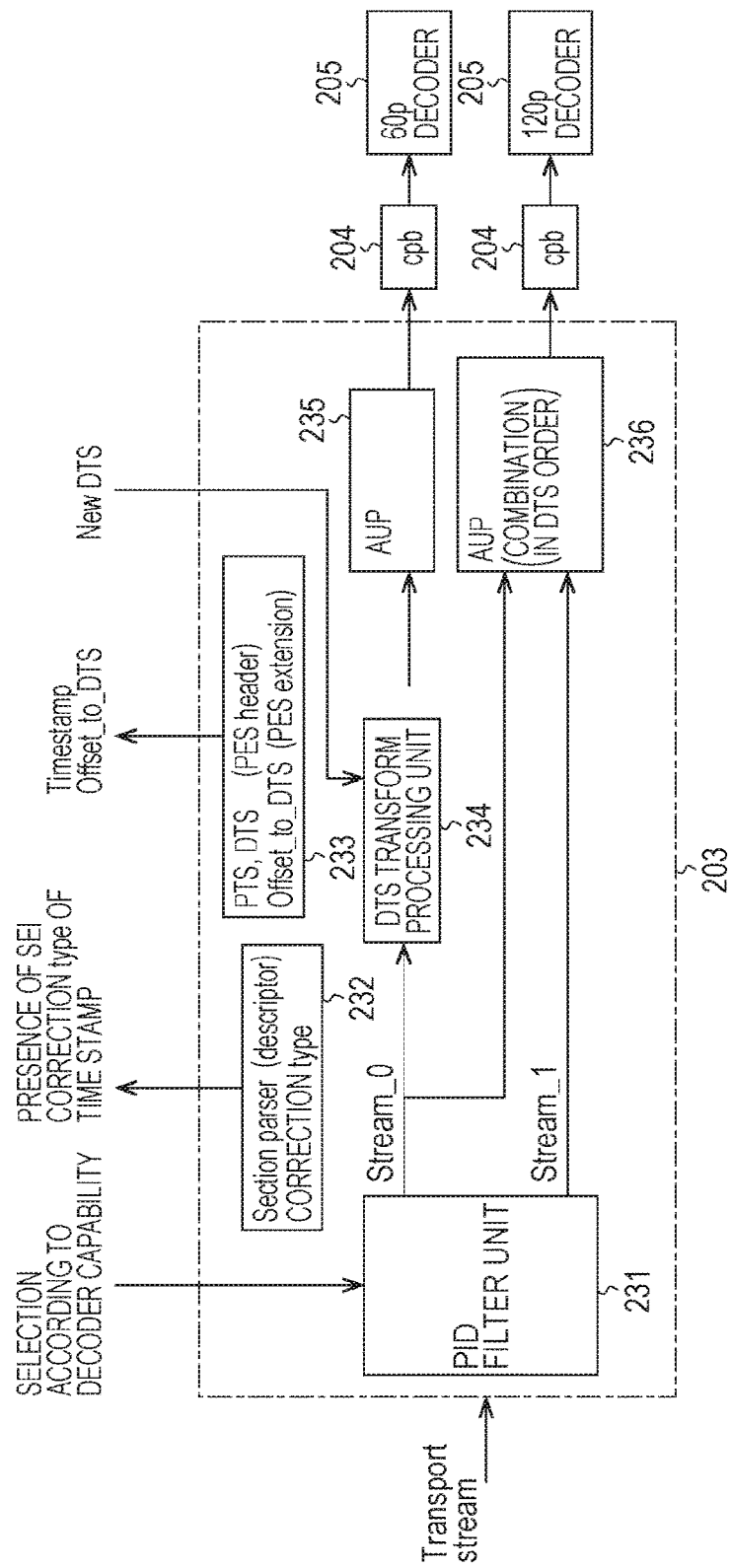
FIG. 25 is a diagram illustrating an example of a functional configuration of a demultiplexer (a system analyzing unit) when "first encoding" is performed on a video stream.

FIG. 25 illustrates an example of a functional configuration of the demultiplexer (the system analyzing unit) 203 when the "first encoding" is performed on the video stream. The demultiplexer 203 includes a PID filter unit 231, a section parser 232, a PES packet parser 233, a DTS transform processing unit 234, and access unit processors 235 and 236.

The PID filter unit 231 performs filtering based on the packet identifier (PID) according to the decoding capability, and extracts a necessary video stream. For example, in the example of the scalable encoding of FIG. 3, there are considered to be the two video streams, that is, the base stream (Stream_0) and the enhancement stream (Stream_1) (see FIG. 9). In this case, when the HFR-non supported 60p decoder is provided, only the base stream (Stream_0) including the encoded image data of the pictures of the layers 0 to 2 that can be processed by the 60p decoder is extracted. Further, for example, when the HFR-supported 120p decoder is provided, in addition to the base stream (Stream_0), the enhancement stream (Stream_1) including the encoded image data of the pictures of the layer 3 is extracted.

Further, for example, in the example of the scalable encoding of FIG. 3, there is considered to be only the video stream of the base stream (Stream_0) (see FIG. 7). In this case, when the HFR-non supported 60p decoder is provided, the base stream (Stream_0) is extracted although the HFR-supported 120p decoder is provided.

The section parser 232 analyzes section data of the video stream (the target video stream) extracted by the PID filter unit 231. Then, the section parser 232 acquires presence information of the timing adjustment SEI based on, for example, the temporal extension descriptor, transfers the presence information of the timing adjustment SEI to the CPU 201, and transfers the type information "adjustment_type" of the time correction information to the CPU 201.

The PES packet parser 233 analyzes the PES packet. The PES packet parser 233 acquires the PTS and the DTS inserted into the PES header and the time correction information "offset_to_DTS" inserted into the PES extension, and transfers the PTS, the DTS, and the time correction information "offset_to_DTS" to the CPU 201.

The DTS transform processing unit 234 performs a DTS transform process when the decoder 205 is the 60p decoder, and the video stream including the encoded image data of the pictures of the predetermined layer or the layer lower than the predetermined layer that can be processed by the 60p decoder is transferred to the decoder 205. The DTS transform processing unit 234 replaces the DTS inserted into the header of the PES packet containing the encoded image data of the pictures of the predetermined layer or the layer lower than the predetermined layer among the encoded image data of the pictures included in the base stream (Stream_0) with a corrected DTS (=New_DTS) corrected using the time correction information "offset_to_DTS".

The DTS transform processing unit 234 can calculate the corrected DTS (=New DTS) by itself and use the corrected DTS but may use the corrected DTS (=New DTS) calculated by the CPU 201 as illustrated in the drawings.

When the decoder 205 is the 60p decoder, the access unit processor 235 transfers the video stream including the encoded image data of the pictures of the predetermined layer or the layer lower than the predetermined layer that can be processed by the 60p decoder to the decoder 205 via the compressed data buffer (cpb) 204.

Here, when the base stream (Stream_0) includes only the encoded image data of the pictures of the predetermined layer or the layer lower than the predetermined layer, the access unit processor 235 transfers the output of the DTS transform processing unit 234 to be accumulated in the compressed data buffer (cpb) 204 without change. On the other hand, when the base stream (Stream_0) includes the encoded image data of the pictures configuring the moving image data, that is, the pictures of all the layers, the access unit processor 235 extracts only a portion corresponding to the encoded image data of the pictures of the predetermined layer or the layer lower than the predetermined layer from the output of the DTS transform processing unit 234 with reference to, for example, the presence of the PES extension, and transfers the extracted portion to be accumulated in the compressed data buffer (cpb) 204.

When the decoder 205 is the 120p decoder, the access unit processor 236 transfers the video stream including the encoded image data of the pictures of all the layers to the decoder 205 via the compressed data buffer (cpb) 204.

Here, when the base stream (Stream_0) includes the encoded image data of the pictures configuring the moving image data, that is, the pictures of all the layers, the access unit processor 236 transfers the base stream (Stream_0) to be accumulated in the compressed data buffer (cpb) 204 without change. On the other hand, when the base stream (Stream_0) includes the encoded image data of the pictures of the predetermined layer or the layer lower than the predetermined layer, and the enhancement stream (Stream_1) includes the encoded image data of the pictures of the layer higher than the predetermined layer, the access unit processor 236 generates one video stream by combining the encoded image data of the two streams in the DTS order, and transfers the generated video stream to be accumulated in the compressed data buffer (cpb) 204.

Figure 26:
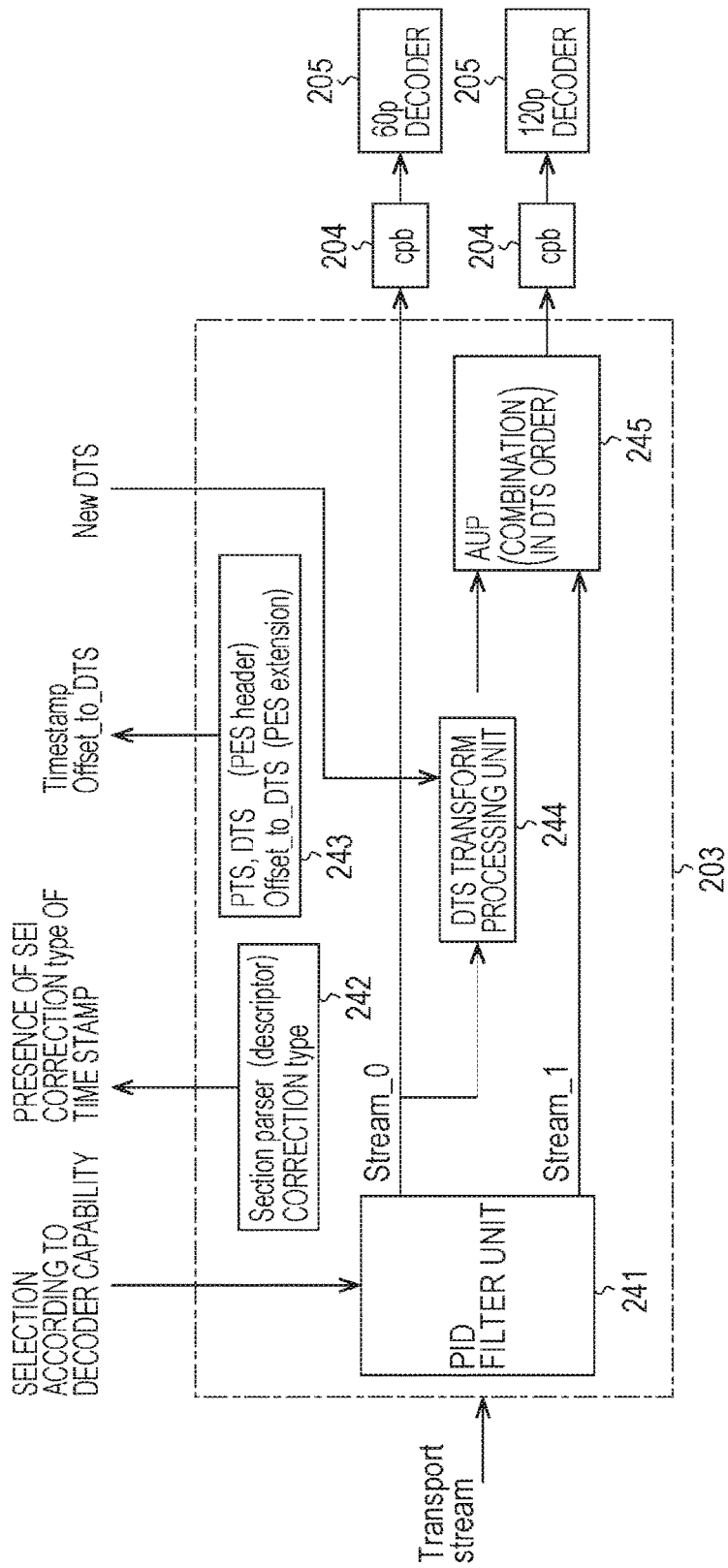
FIG. 26 is a diagram illustrating an example of a functional configuration of a demultiplexer (a system analyzing unit) when "second encoding" is performed on a video stream.

FIG. 26 illustrates an example of a functional configuration of the demultiplexer (the system analyzing unit) 203 when the "second encoding" is performed on the video stream. The demultiplexer 203 includes a PID filter unit 241, a section parser 242, a PES packet parser 243, a DTS transform processing unit 244, and an access unit processor 245.

The PID filter unit 241 performs filtering based on the packet identifier (PID) according to the decoding capability, and extracts a necessary video stream. For example, in the example of the scalable encoding of FIG. 3, there are considered to be the two video streams, that is, the base stream (Stream_0) and the enhancement stream (Stream_1) (see FIG. 6). In this case, when the HFR-non supported 60p decoder is provided, only the base stream (Stream_0) including the encoded image data of the pictures of the layers 0 to 2 that can be processed by the 60p decoder is extracted. Further, for example, when the HFR-supported 120p decoder is provided, in addition to the base stream (Stream_0), the enhancement stream (Stream_1) including the encoded image data of the pictures of the layer 3 is extracted.

The section parser 242 analyzes section data of the video stream (the target video stream) extracted by the PID filter unit 241. Then, the section parser 242 acquires presence information of the timing adjustment SEI based on, for example, the temporal extension descriptor, transfers the presence information of the timing adjustment SEI to the CPU 201, and transfers the type information "adjustment_type" of the time correction information to the CPU 201.

The PES packet parser 243 analyzes the PES packet. The PES packet parser 243 acquires the PTS and the DTS inserted into the PES header and the time correction information "offset_to_DTS" inserted into the PES extension, and transfers the PTS, the DTS, and the time correction information "offset_to_DTS" to the CPU 201.

The DTS transform processing unit 244 performs the DTS transform process when the decoder 205 is the 120p decoder. The DTS transform processing unit 234 replaces the DTS inserted into the header of the PES packet containing the encoded image data of the pictures included in the base stream (Stream_0) with a corrected DTS (=New DTS) corrected using the time correction information "offset_to_DTS". The DTS transform processing unit 244 can calculate the corrected DTS (=New DTS) by itself and use the corrected DTS but may use the corrected DTS (=New DTS) calculated by the CPU 201 as illustrated in the drawings.

When the decoder 205 is the 120p decoder, the access unit processor 245 transfers the video stream including the encoded image data of the pictures of all the layers to the decoder 205 via the compressed data buffer (cpb) 204. In this case, the access unit processor 245 generates one video stream by combining the output of the DTS transform processing unit 244 and the encoded image data of the two streams of the enhancement stream (Stream_1) extracted by the PID filter unit 241 in the DTS order, and transfers the generated video stream to be accumulated in the compressed data buffer (cpb) 204.

Further, when the decoder 205 is the 60p decoder, the demultiplexer 203 transfers the base stream (Stream_0) extracted by the PID filter unit 241 to be accumulated in the compressed data buffer (cpb) 204 without change.

Figure 27:
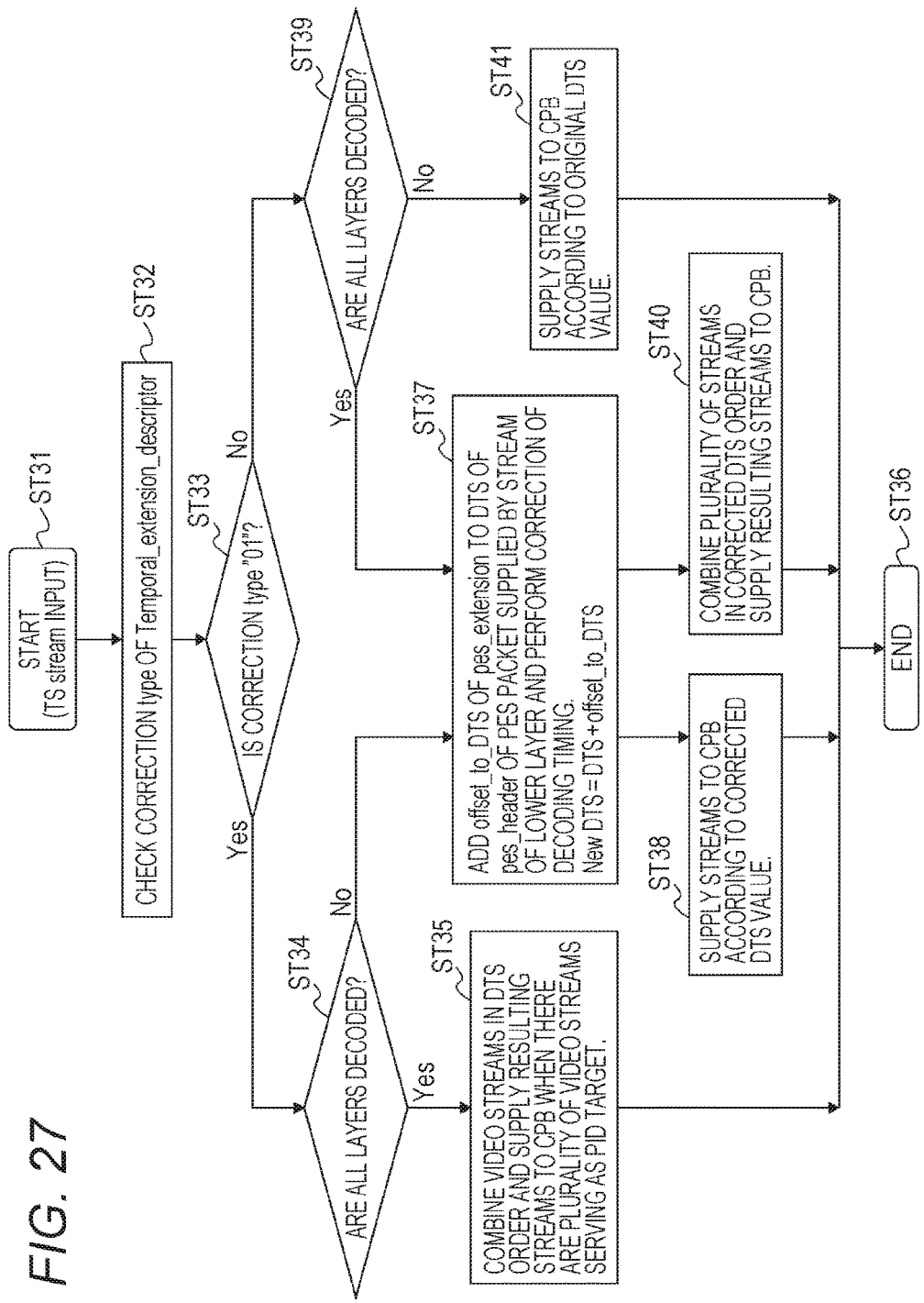
FIG. 27 is a diagram illustrating an example of a process flow of a demultiplexer.

FIG. 27 illustrates an example of a process flow of the demultiplexer 203. In step ST31, the demultiplexer 203 starts the process, and then, in step ST32, the demultiplexer 203 checks the correction type "adjustment_type" of the temporal extension descriptor (Temporal_extension_descriptor).

Then, in step ST33, the demultiplexer 203 determines whether or not the correction type is "01," that is, the type of the time correction information is the first type. When the correction type is "01," in step ST34, the demultiplexer 203 determines whether or not all the layers are decoded. For example, when the decoder 205 is the HFR-supported 120p decoder, all the layers are determined to be decoded, and when the decoder 205 is the HFR-non supported 60p decoder, some layers are determined to be decoded.

When all the layers are decoded, the demultiplexer 203 proceeds to a process of step ST35. In step ST35, the demultiplexer 203 supplies the video stream (encoded stream) serving as a PID target to the compressed data buffer (cpb) 204. When there are a plurality of video streams having a PID target, the video streams are combined in the DTS order and supplied to the compressed data buffer (cpb) 204. After the process of step ST35, in step ST36, the demultiplexer 203 ends the process.

When some layers are determined to be decoded in step ST34, the demultiplexer 203 proceeds to a process of step ST37. In step ST37, the demultiplexer 203 obtains the corrected DTS (New DTS) by adding the time correction information "offset_to_DTS" included in the PES extension to the DTS included in the header of the PES packet to which the stream of the lower layer (the predetermined layer or the layer lower than the predetermined layer) that can be processed by the 60p decoder is supplied.

The CPU 201 may be caused to perform the process of obtaining the corrected DTS. In this case, the demultiplexer 203 notifies the CPU 201 of the time stamp information, and receives the corrected DTS (New DTS) from the CPU 201.

Then, in step ST38, the demultiplexer 203 supplies the stream of the lower layer (the predetermined layer or the layer lower than the predetermined layer) to the compressed data buffer (cpb) 204 according to the corrected DTS value. After the process of step ST38, in step ST36, the demultiplexer 203 ends the process.

Further, when the correction type is not "01" in step ST33, that is, when the correction type is "10," in step ST39, the demultiplexer 203 determines whether or not all the layers are decoded. For example, the decoder 205 determines all the layers to be decoded when the decoder 205 is the HFR-supported 120p decoder, and determines some layers to be decoded when the decoder 205 is the HFR-non supported 60p decoder.

When all the layers are decoded, the demultiplexer 203 proceeds to a process of step ST37. In step ST37, the demultiplexer 203 obtains the corrected DTS (New DTS) by adding the time correction information "offset_to_DTS" included in the PES extension to the DTS included in the header of the PES packet to which the stream of the lower layer (the predetermined layer or the layer lower than the predetermined layer) that can be processed by the 60p decoder is supplied.

Then, in step ST40, the demultiplexer 203 combines a plurality of streams in the corrected DTS order, and supplies the resulting stream to the compressed data buffer (cpb) 204. After the process of step ST40, in step ST36, the demultiplexer 203 ends the process.

Further, when some layers are determined to be decoded in step ST39, the demultiplexer 203 proceeds to a process of step ST41. In step ST41, the demultiplexer 203 supplies the stream of the lower layer (the predetermined layer or the layer lower than the predetermined layer) that can be processed by the 60p decoder to the compressed data buffer (cpb) 204 according to the original DTS value. After the process of step ST41, in step ST36, the demultiplexer 203 ends the process.

Referring back to FIG. 24, the compressed data buffer (cpb) 204 temporarily accumulates the video stream (encoded stream) extracted by the demultiplexer 203. The decoder 205 extracts the encoded image data of the pictures of the layer designated as the layer to be decoded from the video streams accumulated in the compressed data buffer 204. Then, the decoder 205 decodes the extracted encoded image data of each picture at the decoding timing of the picture, and transfers the decoded image data to the uncompressed data buffer (dpb) 206.

Here, in the decoder 205, the layer to be decoded is designated by temporal_id from the CPU 201. The designated layer is all the layers included in the video stream (encoded stream) extracted by the demultiplexer 203 or some layers at the lower layer side and set automatically by the CPU 201 or according to the user's operation. Further, the decoding timing is allocated to the decoder 205 from the CPU 201 based on the DTS. When decoding the encoded image data of each picture, the decoder 205 reads the image data of the referenced picture from the uncompressed data buffer 206 as necessary and uses the image data.

Figure 28:
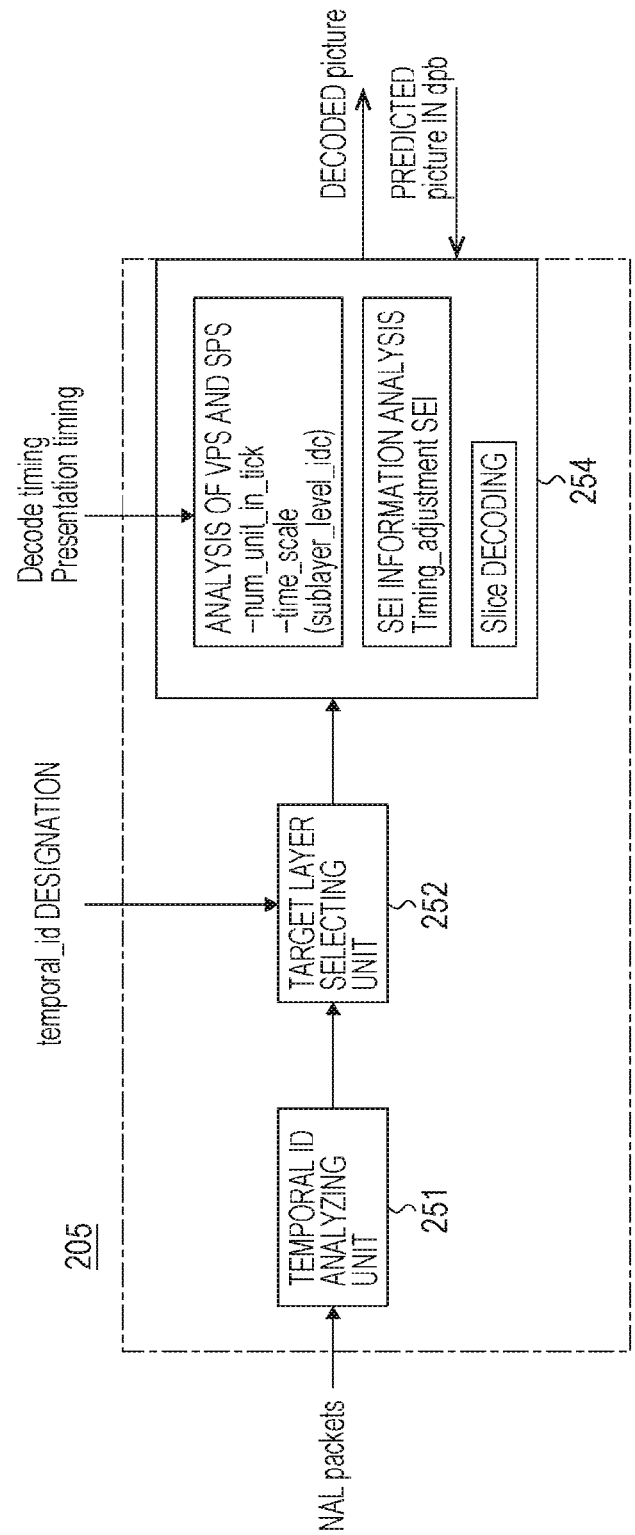
FIG. 28 is a block diagram illustrating an exemplary configuration of a decoder.

FIG. 28 illustrates an exemplary configuration of the decoder 205. The decoder 205 includes a temporal ID analyzing unit 251, the target layer selecting unit 252, and a decoding unit 254. The temporal ID analyzing unit 251 reads the video stream (encoded stream) accumulated in the compressed data buffer 204, and analyzes temporal_id inserted into the NAL unit header of the encoded image data of each picture.

The target layer selecting unit 252 extracts the encoded image data of the pictures of the layer designated as the layer to be decoded from the video stream read from the compressed data buffer 204 based on the analysis result of the temporal ID analyzing unit 251. The encoded image data of each picture extracted by the target layer selecting unit 252 is transferred to the decoding unit 254. The decoding unit 254 sequentially decodes the encoded image data of each picture at the decoding timing, and transfers the decoded image data to the uncompressed data buffer (dpb) 206.

In this case, the decoding unit 254 analyzes the VPS and the SPS, detects, for example, the level designation value "sublayer_level_idc" of the bit rate of each sublayer, and checks whether or not the decoding can be performed within the decoding capability. In this case, the decoding unit 254 further analyzes the SEI, detects, for example, "initial_cpb_removal_time" and "cpb_removal_delay," acquires the correction information related to the decoding timing from the timing adjustment SEI, and checks the decoding timing given from the CPU 201 is appropriate.

Further, when decoding the slice, the decoding unit 254 acquires "ref_idx_10_active (ref_idx_11_active)" as information indicating a prediction destination in the time direction from the slice header, and performs prediction in the time direction. The decoded picture is processed as a reference by other pictures using "short_term_ref_pic_set_idx," or "it_idx_sps" obtained from the slice header as an index.

Referring back to FIG. 24, the uncompressed data buffer (dpb) 206 temporarily accumulates the image data of each picture decoded by the decoder 205. The post-processing unit 207 performs a process of adjusting the frame rates of the image data of the pictures sequentially read from the uncompressed data buffer (dpb) 206 at the display timing according to the display capability. In this case, the display timing is given from the CPU 201 based on the PTS.

For example, when the frame rate of the image data of the decoded pictures is 120 fps, and the display capability is 120 fps, the post-processing unit 207 transfers the image data of the decoded pictures to the display without change. Further, for example, when the frame rate of the image data of the decoded pictures is 120 fps, and the display capability is 60 fps, the post-processing unit 207 performs a sub-sampling process so that the resolution in the time direction for the image data of the decoded pictures is ½ times, and transfers the image data of 60 fps to the display.

Further, for example, when the frame rate of the image data of the decoded pictures is 60 fps, and the display capability is 120 fps, the post-processing unit 207 performs an interpolation process so that the resolution in the time direction for the image data of the decoded pictures is double, and transfers the image data of 120 fps to the display. Further, for example, when the frame rate of the image data of the decoded pictures is 60 fps, and the display capability is 60 fps, the post-processing unit 207 transfers the image data of the decoded pictures to the display without change.

Figure 29:
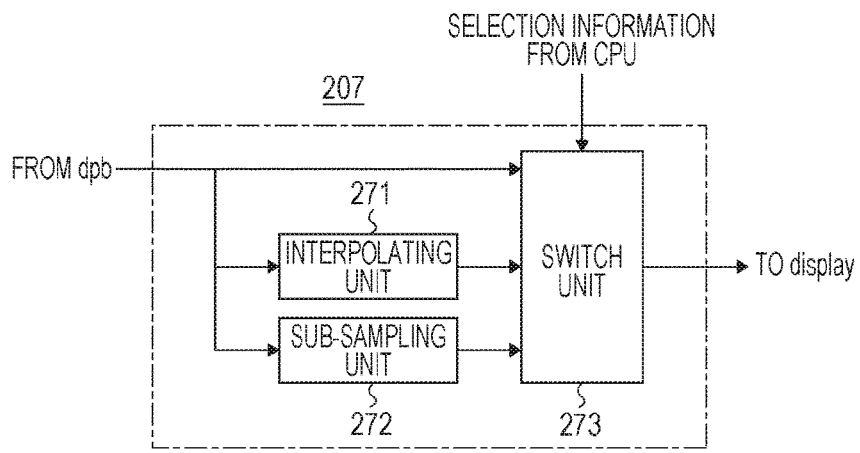
FIG. 29 is a diagram illustrating an exemplary configuration of a post-processing unit.

FIG. 29 illustrates an exemplary configuration of the post-processing unit 207. This example is an example in which it is possible to deal with a case in which the frame rate of the image data of the decoded pictures is 120 fps or 60 fps, and the display capability is 120 fps or 60 fps, as described above.

The post-processing unit 207 includes an interpolating unit 271, a sub-sampling unit 272, and a switch unit 273. The image data of the decoded pictures from the uncompressed data buffer 206 is input to the switch unit 273 directly, after the frame rate becomes double through the interpolating unit 271, or after the frame rate becomes ½ times through the sub-sampling unit 272.

Selection information is supplied from the CPU 201 to the switch unit 273. The CPU 201 generates the selection information automatically with reference to the display capability or according to the user's operation. The switch unit 273 selectively outputs any one of the inputs based on the selection information. As a result, the frame rate of the image data of the pictures sequentially read from the uncompressed data buffer (dpb) 206 at the display timing is adjusted to the display capability.

Figure 30:
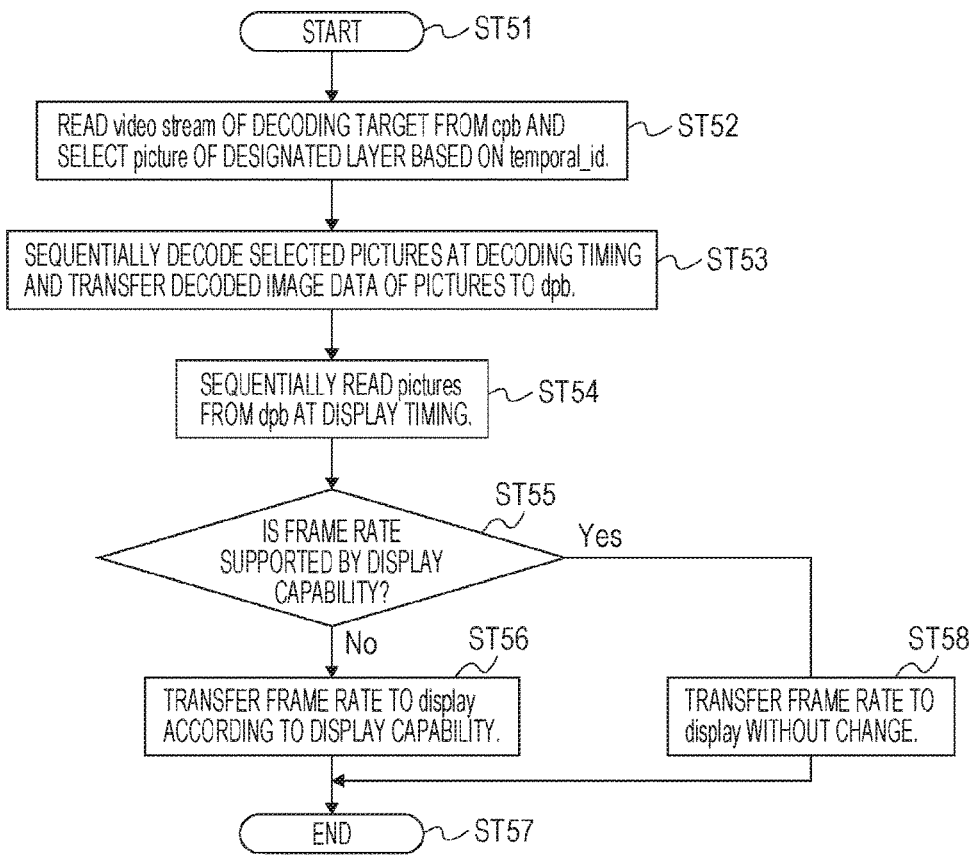
FIG. 30 is a diagram illustrating an example of a process flow of a decoder and a post-processing unit.

FIG. 30 illustrates an example of a process flow of the decoder 205 and the post-processing unit 207. In step ST51, the decoder 205 and the post-processing unit 207 start the process, and then proceed to the process of step ST52. In step ST52, the decoder 205 reads the video stream of the decoding target accumulated in the compressed data buffer (cpb) 204, and selects the picture of the layer designated as the decoding target from the CPU 201 based on the temporal_id.

Then, in step ST53, the decoder 205 sequentially decodes the encoded image data of the selected pictures at the decoding timing, transfers the image data of the decoded pictures to be temporarily accumulated in the uncompressed data buffer (dpb) 206. Then, in step ST54, the post-processing unit 207 reads the image data of the pictures from the uncompressed data buffer (dpb) 206 at the display timing.

Then, the post-processing unit 207 determines whether or not the frame rate of the read image data of the pictures matches the display capability. When the frame rate does not match the display capability, in step ST56, the post-processing unit 207 adjusts the frame rate to the display capability and transfers the adjusted frame rate to the display, and thereafter, in step ST57, the process ends. On the other hand, when the frame rate matches the display capability, in step ST58, the post-processing unit 207 transfers the frame rate to the display without change, and then, in step ST57, the process ends.

An operation of the reception device 200 of FIG. 24 will briefly be described. The receiving unit 202 demodulates the RF modulation signal received through the reception antenna, and acquires the transport stream TS. The transport stream TS is transferred to the demultiplexer 203. The demultiplexer 203 extracts the encoded image data of the pictures configuring the moving image data, that is, the pictures of all the layers or the encoded image data of the pictures of the predetermined layer or the layer (lower layer) lower than the predetermined layer from the transport stream TS according to the decoding capability (the decoder temporal layer capability).

The demultiplexer 203 corrects the DTS inserted into the PES header based on the time correction information inserted into the PES extension in association with each of the encoded image data of the pictures of the predetermined layer or the layer (lower layer) lower than the predetermined layer. In this case, the process corresponding to the "first encoding" or the "second encoding" performed on the video stream included in the transport stream TS is performed.

In the "first encoding," encoding is performed so that the decoding intervals of the encoded image data of the pictures configuring the moving image data, that is, the pictures of all the layers are equal intervals. In the "second encoding," encoding is performed so that the decoding intervals of the encoded image data of the pictures of the predetermined layer or the layer lower than the predetermined layer that can be reproduced by the receiver of the related art that does not support the HFR are equal intervals. Further, in the "second encoding," encoding is performed so that the decoding timings of the encoded image data of the pictures of the layer higher than the predetermined layer are the same timing as when encoding is performed such that the decoding intervals of the encoded image data of the pictures configuring the moving image data, that is, the pictures of all the layers are equal intervals.

In the case of the "first encoding," the time correction information is the first type and used for correcting the decoding timing so that the decoding intervals of the encoded image data of the pictures of the predetermined layer or the layer lower than the predetermined layer are equal intervals. In the case of the "second encoding," the time correction information is the second type and used for correcting the decoding timing so that the decoding timings of the encoded image data of the pictures of the predetermined layer or the layer lower than the predetermined layer are the same as the decoding timings when the encoded image data of the pictures configuring the moving image data, that is, the pictures of all the layers have equal intervals.

Thus, when the "first encoding" is performed, the demultiplexer 203 corrects the decoding timings (DTS) of the encoded image data of the pictures of the predetermined layer or the layer lower than the predetermined layer based on the time correction information when the stream of only the encoded image data of the pictures of the predetermined layer or the layer lower than the predetermined layer is output. As a result, the decoding intervals of the encoded image data of the pictures of the predetermined layer or the layer lower than the predetermined layer become equal intervals.

Further, when the "second encoding" is performed, the demultiplexer 203 corrects the decoding timings (DTS) of the encoded image data of the pictures of the predetermined layer or the layer lower than the predetermined layer based on the time correction information when the stream of the encoded image data of the pictures configuring the moving image data, that is, the pictures of all the layers is output. As a result, the decoding intervals of the encoded image data of the pictures of all the layers become equal intervals.

Then, the video streams (encoded streams) extracted by the demultiplexer 203 are transferred from the demultiplexer 203 to be temporarily accumulated in the compressed data buffer (cpb) 204. The decoder 205 extracts the encoded image data of the pictures of the layer designated as the layer to be decoded from the video streams accumulated in the compressed data buffer 204. Then, the decoder 205 decodes the extracted encoded image data of the respective picture at the decoding timing of the corresponding picture, transfers the extracted encoded image data to be temporarily accumulated in the uncompressed data buffer (dpb) 206. In this case, when the encoded image data of the pictures are decoded, the image data of the referenced picture is read from the uncompressed data buffer 206 and used as necessary.

The image data of the pictures sequentially read from the uncompressed data buffer (dpb) 206 at the display timing is transferred to the post-processing unit 207. The post-processing unit 207 performs the interpolation or the sub-sampling for adjusting the frame rate of the image data of the pictures to the display capability on the image data of the pictures. The image data of the pictures processed by the post-processing unit 207 is supplied to the display, and the moving image configured with the image data of the pictures is displayed.

As described above, in the transceiving system 10 illustrated in FIG. 1, at the transmission side, the time correction information for correcting the decoding timing is inserted into the encoded image data or the PES extension in association with each of the encoded image data of the pictures of the predetermined layer or the layer lower than the predetermined layer that can be processed by the HFR-non supported receiver and then transmitted. Thus, for example, at the reception side, it is possible to correct the decoding timings of the encoded image data of the pictures of the predetermined layer or the layer lower than the predetermined layer using the time correction information according to whether only the encoded image data of the pictures of the predetermined layer or the layer lower than the predetermined layer is decoded or the encoded image data of the pictures of all the layers is decoded. Thus, it is possible to perform excellent reproduction regardless of whether or not the reception side supports the high frame rate.

Further, in the transceiving system 10 illustrated in FIG. 1, at the reception side, the decoding timings of the encoded image data of the pictures of the predetermined layer or the layer lower than the predetermined layer are corrected using the time correction information inserted into the encoded image data or the PES extension according to whether only the encoded image data of the pictures of the predetermined layer or the layer lower than the predetermined layer that can be processed by the HFR-non supported receiver is decoded or the encoded image data of the pictures of all the layers is decoded. Thus, it is possible to perform excellent reproduction, for example, regardless of whether or not the high frame rate is supported.

<2. Modified Examples>

The above embodiment has been described in connection with the example of the scalable encoding of the four layers and the example in which the number of streams is 2 when there are a plurality of video streams. However, needless to say, the application of the present technology is not limited to this example.

Figure 31:
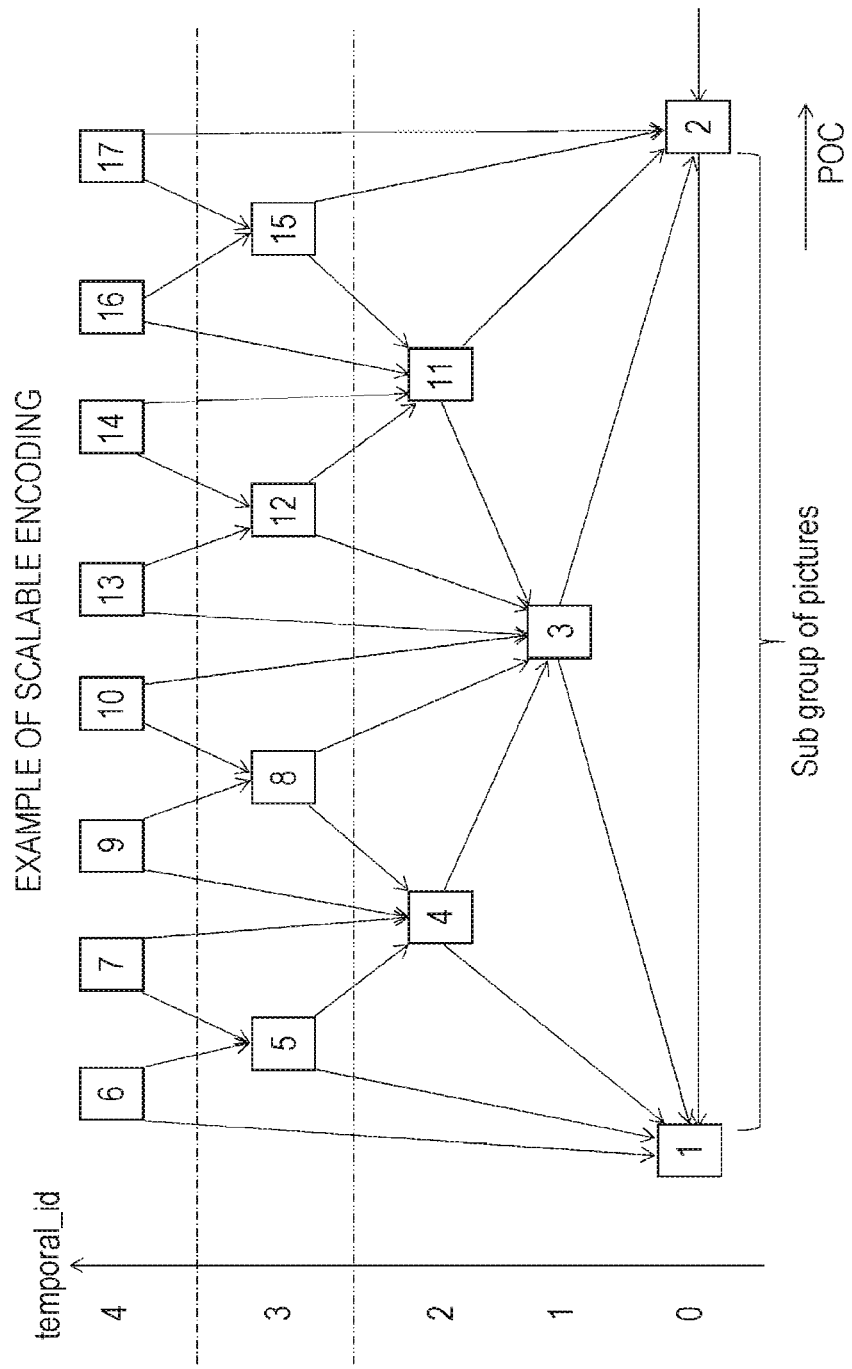
FIG. 31 is a diagram illustrating another example of scalable encoding performed by an encoder.

For example, FIG. 31 illustrates an example of scalable encoding of five layers. In this example, image data is classified into five layers 0 to 4, and encoding is performed on image data of pictures of each layer. A vertical axis indicates a layer. 0 to 4 are set as temporal_id (the layer identification information) arranged in the header portion of the NAL unit (nal_unit) configuring the encoded image data of the pictures of the layers 0 to 4. Meanwhile, a horizontal axis indicates a display order (a picture order of composition (POC)), and the left side is "before" in terms of a display timing, and the right side is "after" in terms of a display timing.

Each of rectangular frames indicates a picture, a number indicates an order of an encoded picture, that is, an encoding order (a decoding order at the reception side). In this example, a sub group of pictures is configured with 16 pictures "2" to "17," and "2" is a first picture of the sub group of pictures. "1" is a picture of a previous sub group of pictures. A group of pictures (GOP) is configured with several sub groups of pictures.

Solid arrows indicate a reference relation of pictures in encoding. For example, the picture "2" is a P picture and encoded with reference to the picture "1." Further, the picture "3" is a B picture and encoded with reference to the pictures "1" and "2." Similarly, the other pictures are encoded with reference to a picture that is close in the display order. A picture of the highest layer is not referred to by other pictures.

In the example of the scalable encoding of FIG. 31, when a plurality of video streams are generated, for example, three video streams are generated. In this case, for example, as delimited by an alternate long and short dash line and an alternate long and two short dashes line, the four layers are divided into three layer sets such that the layers 0 to 2 belong to the lowest layer set, the layer 3 belongs to a layer set positioned to be higher than the lowest layer set, and the layer 4 belongs to a layer set positioned to be higher than the layer set. Further, three video streams (encoded streams) each of which include encoded image data of pictures of each layer set are generated.

In this case, the video stream including the encoded image data of the pictures of the lowest layer set is the base stream, and the stream type thereof is "0x24." The video stream including the encoded image data of the pictures of the layer set positioned to be higher than the lowest layer set is an enhancement stream, and a stream type thereof is "0x25" which is newly defined.

Figure 32:
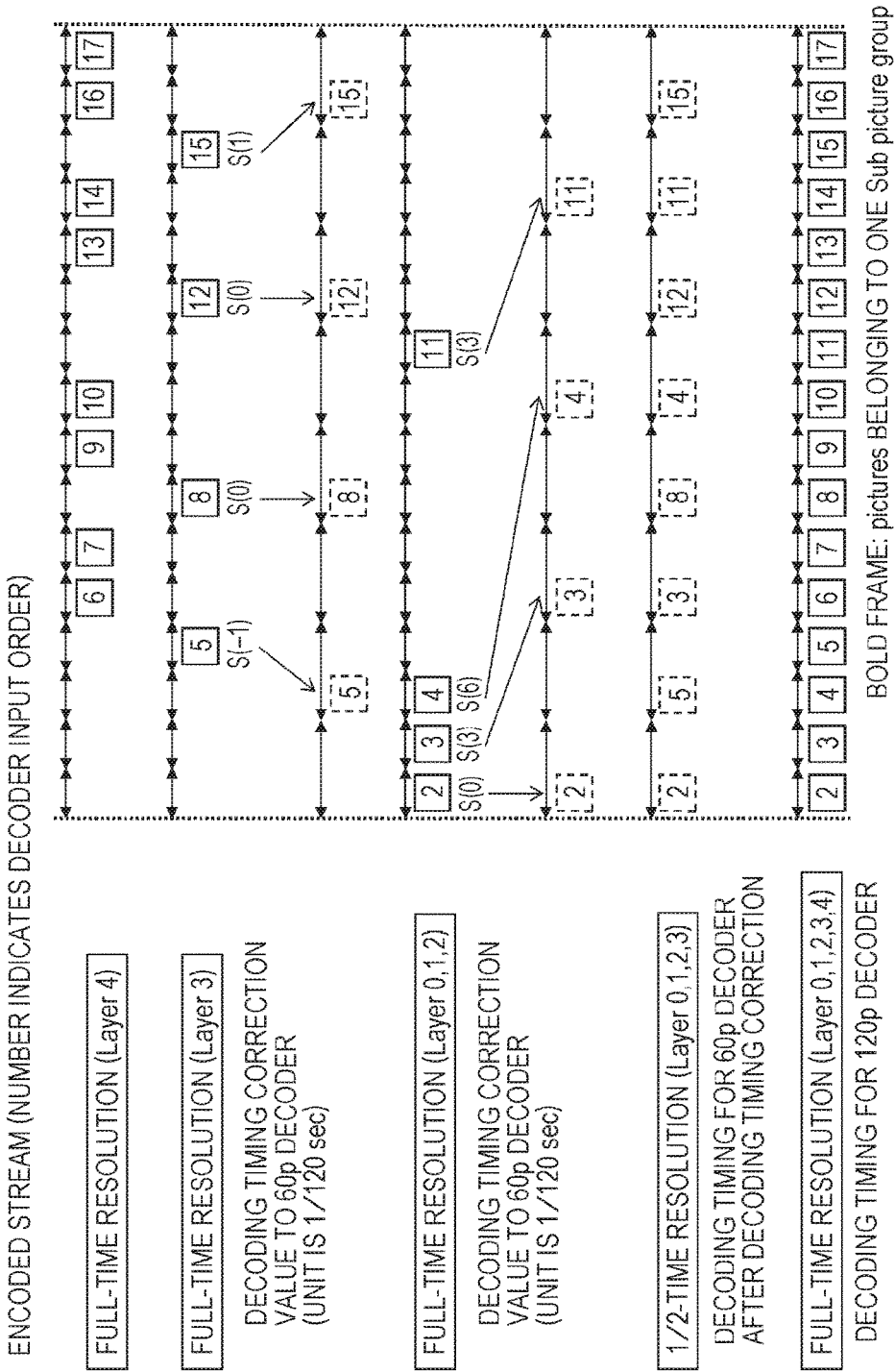
FIG. 32 is a diagram illustrating a first type of correction information S (i) inserted in association with encoded image data of each picture of a predetermined layer or a layer (a lower layer) lower than the predetermined layer when "first encoding" is performed.

FIG. 32 illustrates the correction information S (i) inserted in association with each of the encoded image data of the pictures of the predetermined layer or the layer (lower layer) lower than the predetermined layer when the "first encoding" is performed in the example of the scalable encoding of FIG. 31. For example, in the example of the scalable encoding of FIG. 31, the frame rate by the pictures of all the layers, that is, the layers 0 to 4 is 120 Hz, and the frame rate by the pictures of the layers 0 to 3 is 60 Hz.

The time correction information S (i) is inserted in association with each of the encoded image data of the pictures of the layers 0 to 3 serving as a ½-time resolution portion for 60p decoding among the layers 0 to 4 of a full-time resolution. In this case, a correction value i for an access unit (picture) of "2" is set to "0," the correction value i for an access unit (picture) of "3" is set to "3," the correction value i for an access unit (picture) of "4" is set to "6," and the correction value i for an access unit (picture) of "11" is set to "3." Further, a correction value i for an access unit (picture) of "5" is set to "−1," the correction value i for an access unit (picture) of "8" is set to "0," the correction value i for an access unit (picture) of "12" is set to "0," and the correction value i for an access unit (picture) of "15" is set to "1." In each of subsequent sub group of pictures (GOP), the same is repeated.

At the reception side, when the display is performed by the 60p decoder, the encoded image data of the pictures of the layers 0 to 3 serving as the ½-time resolution portion is taken in the buffer and decoded. At this time, as indicated by the access units (AUs) of the broken line frame, the decoding timings of the encoded image data of the pictures are corrected to be equal intervals (1/60 seconds) based on the time correction information S (i). Further, at the reception side, when the display is performed by the 120p decoder, the encoded image data of the pictures of 0 to 4 of the full-time resolution is taken in the buffer and decoded at equal intervals (1/120 seconds) according to the original decoding timings.

Figure 33:
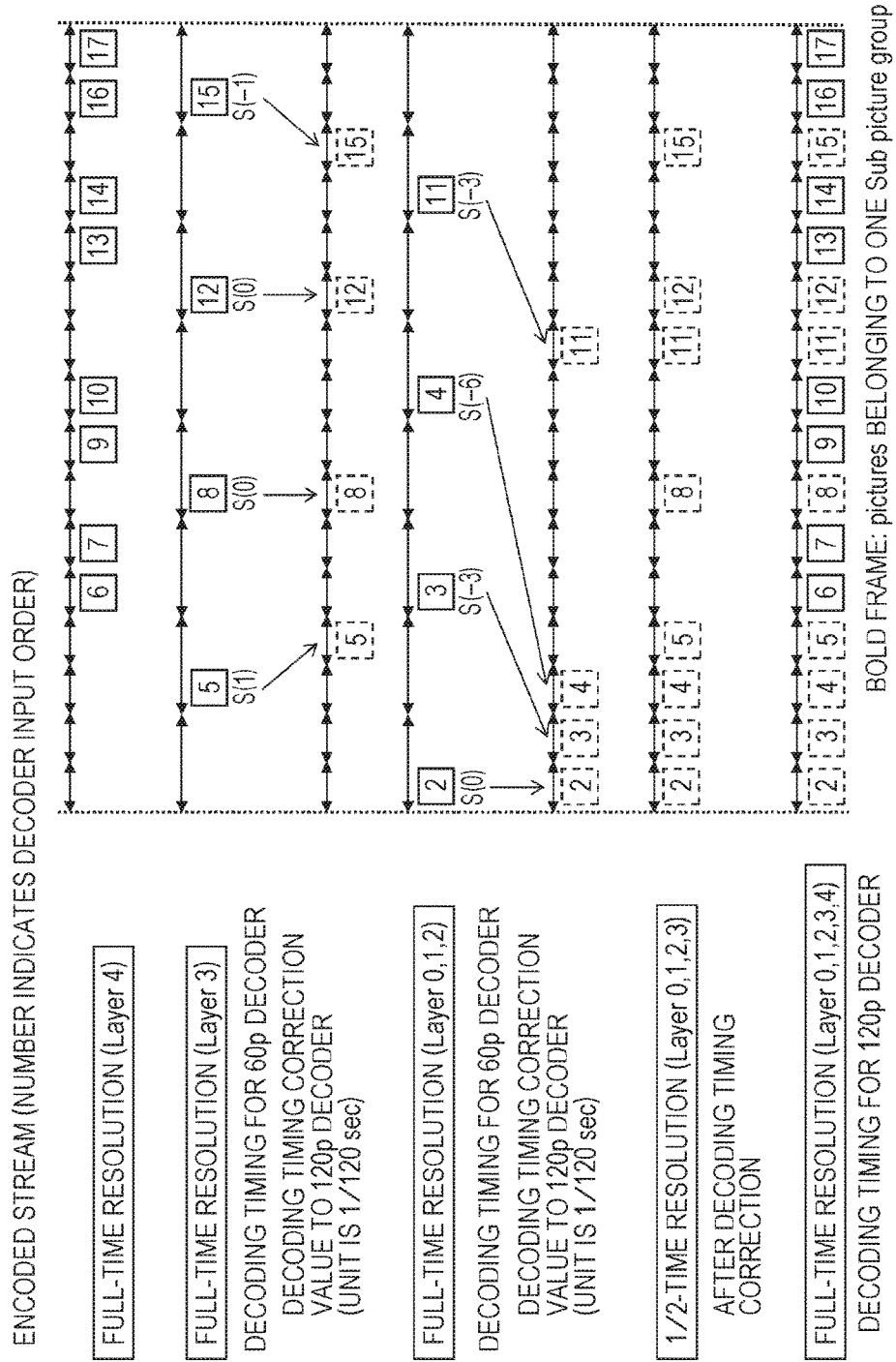
FIG. 33 is a diagram illustrating a second type of correction information S (i) inserted in association with encoded image data of each picture of a layer (a lower layer) below a predetermined layer when "second encoding" is performed.

FIG. 33 illustrates the correction information S (i) inserted in association with each of the encoded image data of the pictures of the predetermined layer or the layer (lower layer) lower than the predetermined layer when the "second encoding" is performed in the example of the scalable encoding of FIG. 31.

The time correction information S (i) is inserted in association with each of the encoded image data of the pictures of the layers 0 to 3 serving as the ½-time resolution portion among the layers 0 to 4 of the time resolution. In this case, the correction value i for an access unit (picture) of "2" is set to "0," the correction value i for an access unit (picture) of "3" is set to "−3," the correction value i for an access unit (picture) of "4" is set to "−6," and the correction value i for an access unit (picture) of "11" is set to "−3." Further, the correction value i for an access unit (picture) of "5" is set to "1," the correction value i for an access unit (picture) of "8" is set to "0," the correction value i for an access unit (picture) of "12" is set to "0," and the correction value i for an access unit (picture) of "15" is set to "−1." In each of subsequent sub group of pictures (GOP), the same is repeated.

At the reception side, when the display is performed by the 60p decoder, the encoded image data of the pictures of the layers 0 to 3 serving as the ½-time resolution portion is taken in the buffer and decoded at equal intervals (1/60 seconds) according to the original decoding timings. At the reception side, when the display is performed by the 120p decoder, the encoded image data of the pictures of 0 to 4 of the full-time resolution is taken in the buffer and decoded. At this time, as indicated by the access units (AUs) of the broken line frame, the decoding timings of the encoded image data of the pictures of the layers 0 to 3 are corrected to be the same timings as when encoding is performed so that the decoding intervals of the encoded image data of the pictures of all the layers are equal intervals (1/120 seconds).

The above embodiment has been described in connection with the example of the combination of 60p (60 Hz) and 120p (120 Hz), but the combination of the frame rates is not limited thereto. For example, the same applies even to a combination of 50p (50 Hz) and 100p (100 Hz).

Further, in the above embodiment, the transceiving system 10 includes the transmission device 100 and the reception device 200, but a configuration of a transceiving system to which the present technology is applied is not limited thereto. For example, a portion of the reception device 200 may have a set-top box and a monitor which are connected through a digital interface such as High-Definition Multimedia Interface (HDMI). Here, "HDMI" is a registered trademark.

Further, the above embodiment has been described in connection with the container being the transport stream (MPEG-2 TS). However, the present technology can similarly be applied to a system having a configuration delivered to a reception terminal using a network such as the Internet as well. In the Internet delivery, the delivery is often performed through a container having MP4 or any other format. In other words, containers having various formats such as a transport stream (MPEG-2TS) employed in a digital broadcasting standard or MP4 used in the Internet delivery are used as the container.

Further, the present technology may have the following configurations.

(1) A transmission device, including:
an image encoding unit that classifies image data of pictures configuring moving image data into a plurality of layers, encodes the classified image data of the pictures of each of the layers, and generates a video stream including the encoded image data of the pictures of each of the layers;
a transmitting unit that transmits a container of a predetermined format including the video stream; and a correction information inserting unit that inserts time correction information for correcting a decoding timing into the encoded image data and/or a packet containing the encoded image data in association with each of the encoded image data of the pictures of a predetermined layer or a layer lower than the predetermined layer.

(2) The transmission device according to (1),
wherein the image encoding unit performs the encoding so that decoding intervals of the encoded image data of the pictures configuring the moving image data are equal intervals, and
the time correction information is information for correcting the decoding timing so that the decoding intervals of the encoded image data of the pictures of the predetermined layer or the layer lower than the predetermined layer are equal intervals.

(3) The transmission device according to (1),
wherein the image encoding unit performs the encoding so that the decoding timings of the encoded image data of the pictures of a layer higher than the predetermined layer are the same decoding timings when the decoding intervals of the encoded image data of the pictures configuring the moving image data are equal intervals, and the decoding intervals of the encoded image data of the pictures of the predetermined layer or the layer lower than the predetermined layer are equal intervals, and
the time correction information is information for correcting the decoding timing so that the decoding timings of the encoded image data of the pictures of the predetermined layer or the layer lower than the predetermined layer are the same as the decoding timings when the encoded image data of the pictures configuring the moving image data are equal intervals.

(4) The transmission device according to any of (1) to (3),
wherein type information identifying whether the time correction information is a first type or a second type is added to the time correction information,
the first type indicates that the video stream is encoded so that the decoding intervals of the encoded image data of the pictures configuring the moving image data are equal intervals, and the time correction information is the information for correcting the decoding timing so that the decoding intervals of the encoded image data of the pictures of the predetermined layer or the layer lower than the predetermined layer are equal intervals, and
the second type indicates that the video stream is encoded so that the decoding timings of the encoded image data of the pictures of a layer higher than the predetermined layer are the same decoding timings when the decoding intervals of the encoded image data of the pictures configuring the moving image data are equal intervals, and the decoding intervals of the encoded image data of the pictures of the predetermined layer or the layer lower than the predetermined layer are equal intervals, and the time correction information is the information for correcting the decoding timing so that the decoding timings of the encoded image data of the pictures of the predetermined layer or the layer lower than the predetermined layer are the same as the decoding timings when the encoded image data of the pictures configuring the moving image data are equal intervals.

(5) The transmission device according to any of (1) to (4),
wherein, when a frame rate by the pictures configuring the moving image data is a first frame rate, and a frame rate by the pictures of the predetermined layer or the layer lower than the predetermined layer is a second frame rate, the second frame rate is ½ times of the first frame rate.

(6) The transmission device according to any of (1) to (5),
wherein the image encoding unit divides the plurality of layers into a predetermined number (2 or more) of layer sets, and generates the predetermined number of video streams including the divided encoded image data of the pictures of each of the layer sets, and
the predetermined layer or the layer lower than the predetermined layer and a layer higher than the predetermined layer belong to different layer sets.

(7) The transmission device according to any of (1) to (6),
wherein the container is a transport stream, and
the correction information inserting unit inserts the time correction information into an extension filed of a PES packet.

(8) The transmission device according to any of (1) to (7), further including,
an identification information inserting unit that inserts identification information identifying that the time correction information is inserted into the encoded image data and/or a packet containing the encoded image data into the layer of the container.

(9) A transmission method, including:
a step of classifying image data of pictures configuring moving image data into a plurality of layers, encoding the classified image data of the pictures of each of the layers, and generating a video stream including the encoded image data of the pictures of each of the layers;
a step of transmitting, by a transmitting unit, a container of a predetermined format including the generated video stream; and a step of inserting time correction information for correcting a decoding timing into the encoded image data and/or a packet containing the encoded image data in association with each of the encoded image data of the pictures of a predetermined layer or a layer lower than the predetermined layer.

(10) A reception device, including:
a receiving unit that receives a video stream including encoded image data of pictures of each of layers obtained such that image data of pictures configuring moving image data are classified into a plurality of layers and encoded; and
a processing unit that processes the video stream,
wherein time correction information for correcting a decoding timing is inserted into the encoded image data and/or a packet containing the encoded image data in association with each of the encoded image data of the pictures of a predetermined layer or a layer lower than the predetermined layer among the encoded image data of the pictures of the layers included in the video stream.

(11) The reception device according to (10),
wherein the video stream is encoded so that the decoding intervals of the encoded image data of the pictures configuring the moving image data are equal intervals, and
the time correction information is information for correcting the decoding timing so that the decoding intervals of the encoded image data of the pictures of the predetermined layer or the layer lower than the predetermined layer are equal intervals.

(12) The reception device according to (10),
wherein the video stream is encoded so that the decoding timings of the encoded image data of the pictures of a layer higher than the predetermined layer are the same decoding timings when the decoding intervals of the encoded image data of the pictures configuring the moving image data are equal intervals, and the decoding intervals of the encoded image data of the pictures of the predetermined layer or the layer lower than the predetermined layer are equal intervals, and
the time correction information is information for correcting the decoding timing so that the decoding timings of the encoded image data of the pictures of the predetermined layer or the layer lower than the predetermined layer are the same as the decoding timings when the encoded image data of the pictures configuring the moving image data are equal intervals.

(13) A reception device, including:
a receiving unit that receives a container of a predetermined format including a video stream including encoded image data of pictures of each of layers obtained such that image data of pictures configuring moving image data are classified into a plurality of layers and encoded; and
an image decoding processing unit that obtains image data by selectively taking the encoded image data of the pictures of the layer according to a decoding capability in a buffer from the video stream and decoding the encoded image data of the pictures taken in the buffer,
wherein time correction information for correcting a decoding timing is inserted into the encoded image data and/or a packet containing the encoded image data in association with each of the encoded image data of the pictures of a predetermined layer or a layer lower than the predetermined layer among the encoded image data of the pictures of the layers included in the video stream, and
the image decoding processing unit corrects the decoding timings of the encoded image data of the pictures of the predetermined layer or the layer lower than the predetermined layer using the time correction information according to whether only the encoded image data of the pictures of the predetermined layer or the layer lower than the predetermined layer is decoded or the encoded image data of the pictures of all the layers is decoded.

(14) The reception device according to (13),
wherein type information identifying whether the time correction information is a first type or a second type is added to the time correction information,
the first type indicates that the video stream is encoded so that the decoding intervals of the encoded image data of the pictures configuring the moving image data are equal intervals, and the time correction information is the information for correcting the decoding timing so that the decoding intervals of the encoded image data of the pictures of the predetermined layer or the layer lower than the predetermined layer are equal intervals,
the second type indicates that the video stream is encoded so that the decoding timings of the encoded image data of the pictures of a layer higher than the predetermined layer are the same decoding timings when the decoding intervals of the encoded image data of the pictures configuring the moving image data are equal intervals, and the decoding intervals of the encoded image data of the pictures of the predetermined layer or the layer lower than the predetermined layer are equal intervals, and the time correction information is the information for correcting the decoding timing so that the decoding timings of the encoded image data of the pictures of the predetermined layer or the layer lower than the predetermined layer are the same as the decoding timings when the encoded image data of the pictures configuring the moving image data are equal intervals, and
the image decoding processing unit performs switching between correction of the decoding timing performed using the time correction information when only the encoded image data of the pictures of the predetermined layer or the layer lower than the predetermined layer is decoded and correction of the decoding timing performed using the time correction information when the encoded image data of the pictures of all the layers is decoded based on the type information added to the time correction information.

(15) The reception device according to (13) or (14),
wherein the video stream is encoded so that the decoding intervals of the encoded image data of the pictures configuring the moving image data are equal intervals,
the time correction information is information for correcting the decoding timing so that the decoding intervals of the encoded image data of the pictures of the predetermined layer or the layer lower than the predetermined layer are equal intervals, and
the image decoding processing unit corrects the decoding timings of the encoded image data of the pictures of the predetermined layer or the layer lower than the predetermined layer using the time correction information when only the encoded image data of the pictures of the predetermined layer or the layer lower than the predetermined layer is decoded.

(16) The reception device according to (13) or (14),
wherein the video stream is encoded so that the decoding timings of the encoded image data of the pictures of a layer higher than the predetermined layer are the same decoding timings when the decoding intervals of the encoded image data of the pictures configuring the moving image data are equal intervals, and the decoding intervals of the encoded image data of the pictures of the predetermined layer or the layer lower than the predetermined layer are equal intervals, the time correction information is information for correcting the decoding timing so that the decoding timings of the encoded image data of the pictures of the predetermined layer or the layer lower than the predetermined layer are the same as the decoding timings when the encoded image data of the pictures configuring the moving image data are equal intervals, and the image decoding processing unit corrects the decoding timings of the encoded image data of the pictures of the predetermined layer or the layer lower than the predetermined layer using the time correction information when the encoded image data of the pictures of all the layers is decoded.

(17) The reception device according to any of (13) to (16), wherein, when the encoded image data of the pictures of the predetermined layer or the layer lower than the predetermined layer or all the layers taken in the buffer are included in a plurality of video streams, the image decoding processing unit combines the encoded image data of the pictures into one stream in a decoding timing order based on decoding timing information and takes the one stream in the buffer.

(18) A reception method, including:

a reception step of receiving, by a receiving unit, a container of a predetermined format including a video stream including encoded image data of pictures of each of layers obtained such that image data of pictures configuring moving image data are classified into a plurality of layers and encoded; and an image decoding processing step of obtaining image data by selectively taking the encoded image data of the pictures of the layer according to a decoding capability in a buffer from the video stream and decoding the encoded image data of the pictures taken in the buffer, wherein time correction information for correcting a decoding timing is inserted into the encoded image data and/or a packet containing the encoded image data in association with each of the encoded image data of the pictures of a predetermined layer or a layer lower than the predetermined layer among the encoded image data of the pictures of the layers included in the video stream, and in the image decoding processing step, the decoding timings of the encoded image data of the pictures of the predetermined layer or the layer lower than the predetermined layer is corrected using the time correction information according to whether only the encoded image data of the pictures of the predetermined layer or the layer lower than the predetermined layer is decoded or the encoded image data of the pictures of all the layers is decoded.

One of the main features of the present technology lies in that the time correction information for correcting the decoding timing is inserted into the encoded image data or the PES extension in association with each of the encoded image data of the pictures of the predetermined layer or the layer (lower layer) lower than the predetermined layer that can be processed by the HFR-non supported receiver and transmitted, and thus it is possible to perform excellent reproduction regardless of whether or not the reception side supports the high frame rate (see FIGS. 8 and 10).

REFERENCE SIGNS LIST

10 Transceiving system
100 Transmission device
101 CPU
102 Encoder
103 Compressed data buffer (cpb)
104 Multiplexer
105 Transmitting unit
121 Temporal ID generating unit
122 Buffer delay control unit
123 HRD setting unit
124 Parameter set/SEI encoding unit
125 Slice encoding unit
126 NAL packetizing unit
142 Section coding unit
143-1 to 143-N PES packetizing unit
144 Switch unit
145 Transport packetizing unit
200 Reception device
201 CPU
202 Receiving unit
203 Demultiplexer
204 Compressed data buffer (cpb)
205 Decoder
206 Uncompressed data buffer (dpb)
207 Post-processing unit
231, 241 PID filter unit
232, 242 Section parser
233, 243 PES packet parser
234, 244 DTS transform processing unit
235, 236, 245 Access unit processor
251 Temporal ID analyzing unit
252 Target layer selecting unit
254 Decoding unit
271 Interpolating unit
272 Sub-sampling unit
273 Switch unit

The invention claimed is:

1. A transmission device, comprising:
circuitry configured to:
classify image data of pictures configuring moving image data into a plurality of layers;
divide the plurality of layers into a first layer set and a second layer set, the first layer set including a predetermined layer, and the second layer set including a layer which is higher than the predetermined layer;
encode the classified image data of the pictures of each of the plurality of layers so that decoding intervals of the encoded image data of the pictures included in the first layer set are adjusted to be a predetermined size;
insert time correction information into the encoded image data of the pictures included in the first layer set, in which the time correcting information is used for correcting a decoding timing of the encoded image data of the pictures;
generate a video stream including the encoded image data of the pictures of each of the plurality of layers; and
transmit a container of a predetermined format including the video stream.

2. The transmission device according to claim 1, wherein the circuitry is configured to encode the classified image data of the pictures of each of the plurality of layers so that the decoding intervals of the encoded image data of the pictures included in both of the first layer set and the second layer set are adjusted to be the predetermined size, and
wherein the time correction information is information for correcting the decoding timing so that the decoding intervals of the encoded image data of the pictures only included in the first layer set are adjusted to be a same size.

3. The transmission device according to claim 1, wherein circuitry is configured to encode the classified image data of the pictures of each of the plurality of layers so that decoding intervals of the encoded image data of the pictures only included in the first layer set are adjusted to be the predetermined size are, and wherein the time correction information is information for correcting the decoding timing so that the decoding intervals of the encoded image data of the pictures included in both of the first layer set are adjusted to be a same size.

4. The transmission device according to claim 1, wherein type information identifying whether the time correction information is a first type or a second type is added to the time correction information, wherein the first type indicates that the video stream is encoded so that the decoding intervals of the encoded image data of the pictures included in both of the first layer set and the second layer set are adjusted to be the predetermined size, and the time correction information is the information for correcting the decoding timing so that the decoding intervals of the encoded image data of the pictures only included in the first layer set are adjusted to be a same size, and wherein the second type indicates that the video stream is encoded so that the decoding intervals of the encoded image data of the pictures only included in the first layer set are adjusted to be the predetermined size, and the time correction information is the information for correcting the decoding timing so that the decoding intervals of the encoded image data of the pictures included in both of the first layer set are adjusted to be a same size.

5. The transmission device according to claim 1, wherein, when a frame rate by the pictures configuring the moving image data is a first frame rate, and a frame rate by the pictures of the first layer set is a second frame rate, the second frame rate is ½times of the first frame rate.

6. The transmission device according to claim 1, wherein the container is a transport stream, and the circuitry is configured to insert the time correction information into an extension filed of a PES packet.

7. The transmission device according to claim 1, wherein the circuitry further configured to insert identification information identifying that the time correction information is inserted into the encoded image data and/or a packet containing the encoded image data into the layer of the container.

8. The transmission device according to claim 1, wherein the first layer set further includes one or more layers lower than the predetermined layer.

9. A transmission method, comprising:
classifying image data of pictures configuring moving image data into a plurality of layers;
dividing the plurality of layers into a first layer set and a second layer set, the first layer set including a predetermined layer, and the second layer set including a layer which is higher than the predetermined layer;
encoding the classified image data of the pictures of each of the plurality of layers so that decoding intervals of the encoded image data of the pictures included in the first layer set are adjusted to be a predetermined size;
insert time correction information into the encoded image data of the pictures included in the first layer set, in which the time correcting information is used for correcting a decoding timing of the encoded image data of the pictures;
generating a video stream including the encoded image data of the pictures of each of the plurality of the layers; and
transmitting, a container of a predetermined format including the generated video stream.

10. A reception device, comprising:
circuitry configured to;
receive a video stream including encoded image data of pictures of each of a plurality of layers, in which the plurality of layers are divided into a first layer set and a second layer set. the first layer set including a predetermined layer, and the second layer set including a layer that is higher than the predetermined layer; and
process the video stream based on decoding capability of the encoded image data of the pictures of the plurality of layers,
wherein the image data of the pictures of each of the plurality of layers are encoded so that decoding intervals of the encoded image data of the pictures included in the first layer set are adjusted to be a predetermined size,
wherein time correction information is inserted into the encoded image data of the pictures included in the first layer set, in which the time correcting information is used for correcting a decoding timing of the encoded image data of the pictures.

11. The reception device according to claim 10, wherein the image data of the pictures of each of the plurality of layers are encoded so that the decoding intervals of the encoded image data of the pictures included in both of the first layer set and the second layer set are adjusted to be the predetermined size, and wherein the time correction information is information for correcting the decoding timing so that the decoding intervals of the encoded image data of the pictures only included in the first layer set are adjusted to be a same size.

12. The reception device according to claim 10, wherein the image data of the pictures of each of the plurality of layers are encoded so that decoding intervals of the encoded image data of the pictures only included in the first layer set are adjusted to be the predetermined size, and wherein the time correction information is information for correcting the decoding timing so that the decoding intervals of the encoded image data of the pictures included in both of the first layer set are adjusted to be a same size.

13. The reception device according to claim 10, wherein the first layer set further includes one or more layers lower than the predetermined layer.

14. A reception device, comprising:
circuitry configured to:
receive a video stream including encoded image data of pictures of each of a plurality of layers, in which the plurality of layers are divided into a first layer set and a second layer set, the first layer set including a predetermined layer, and the second layer set including a layer that is higher than the predetermined layer; and process the video stream based on decoding capability of the encoded image data of the pictures of the plurality of layers, wherein the image data of the pictures of each of the plurality of layers are encoded so that decoding intervals of the encoded image data of the pictures included in the first layer set are adjusted to be a predetermined size, wherein time correction information is inserted into the encoded image data of the pictures included in the first layer set, in which the time correcting information is used for correcting a decoding timing of the encoded image data of the pictures, wherein the circuitry is configured to correct the decoding timings of the encoded image data of the pictures included in the first layer set by using the time correction information, according to whether the encoded image data of the pictures only included in the first layer set is decoded or the encoded image data of the pictures included in both of the first layer set and the second layer set is decoded, wherein the circuitry is configured to decode the encoded image data of the pictures at the respective corrected decoding timings and transfer to a buffer for storing temporarily, wherein the circuitry is configured to retrieve the decoded image data of the pictures from the buffer and provide the decoded image data of the pictures for display at display timings.

15. The reception device according to claim 14, wherein type information identifying whether the time correction information is a first type or a second type is added to the time correction information, wherein the first type indicates that the video stream is encoded so that the decoding intervals of the encoded image data of the pictures pictures included in both of the first layer set and the second layer set are adjusted to be the predetermined size, and the time correction information is the information for correcting the decoding timing so that the decoding intervals of the encoded image data of the pictures only included in the first layer set are adjusted to be a same size, wherein the second type indicates that the video stream is encoded so that the decoding intervals of the encoded image data of the pictures only included in the first layer set are adjusted to be the predetermined size, and the time correction information is the information for correcting the decoding timing so that the decoding intervals of the encoded image data of the pictures included in both of the first layer set are adjusted to be a same size, and wherein the circuitry is configured to perform switching between correction of the decoding timing performed using the time correction information when the encoded image data of the pictures only included in the first layer set is decoded and correction of the decoding timing performed using the time correction information when the encoded image data of the pictures included in both of the first layer set and the second layer set is decoded based on the type information added to the time correction information.

16. The reception device according to claim 14, wherein the video stream is encoded so that the decoding intervals of the encoded image data of the pictures included in both of the first layer set and the second layer set are adjusted to be the predetermined size, wherein the time correction information is information for correcting the decoding timing so that the decoding intervals of the encoded image data of the pictures only included in the first layer set are adjusted to be a same size, and wherein the circuitry is configured to correct the decoding timings of the encoded image data of the pictures included in the first layer set by using the time correction information, in case that the encoded image data of the pictures only included in the first layer set is decoded.

17. The reception device according to claim 14, wherein the video stream is encoded so that decoding intervals of the encoded image data of the pictures only included in the first layer set are adjusted to be the predetermined size, wherein the time correction information is information for correcting the decoding timing so that the decoding intervals of the encoded image data of the pictures included in both of the first layer set are adjusted to be a same size, and wherein the circuitry is configured to correct the decoding timings of the encoded image data of the pictures included in the first layer set by using the time correction information, in case that the encoded image data of the pictures included in both of the first layer set and the second layer set is decoded.

18. The reception device according to claim 14, wherein the circuitry is configured to combine the decoded image data of the pictures into one stream in a decoding timing order based on decoding timing information and transfer the one stream in the buffer.

19. The reception device according to claim 14, wherein the first layer set further includes one or more layers lower than the predetermined layer.

20. A reception method, comprising:

receiving a video stream including encoded image data of pictures of each of a plurality of layers, in which the plurality of layers are divided into a first layer set and a second layer set, the first layer set including a predetermined layer, and the second layer set including a layer that is higher than the predetermined layer;

processing the video stream based on decoding capability of the encoded image data of the pictures of the plurality of layers, wherein the image data of the pictures of each of the plurality of layers are encoded so that decoding intervals of the encoded image data of the pictures included in the first layer set are adjusted to be a predetermined size, and time correction information is inserted into the encoded image data of the pictures included in the first layer set, in which the time correcting information is used for correcting a decoding timing of the encoded image data of the pictures;

correcting the decoding timings of the encoded image data of the pictures included in the first layer set by using the time correction information, according to whether the encoded image data of the pictures only included in the first layer set is decoded or the encoded image data of the pictures included in both of the first layer set and the second layer set is decoded;

decoding the encoded image data of the pictures at the respective corrected decoding timings and transfer to a buffer for storing temporarily; and retrieving the decoded image data of the pictures from the buffer and provide the decoded image data of the pictures for display at display timings.

* * * * *